United States Patent
Yamauchi et al.

(10) Patent No.: US 10,550,040 B2
(45) Date of Patent: Feb. 4, 2020

(54) RED ZIRCONIA SINTERED BODY AND METHOD FOR MANUFACTURING THE SAME

(71) Applicant: TOSOH CORPORATION, Yamaguchi (JP)

(72) Inventors: Shoichi Yamauchi, Kanagawa (JP); Takeshi Ito, Kanagawa (JP); Satoshi Tsuchiya, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 1 day.

(21) Appl. No.: 15/749,336

(22) PCT Filed: Sep. 1, 2016

(86) PCT No.: PCT/JP2016/075665
§ 371 (c)(1),
(2) Date: Jan. 31, 2018

(87) PCT Pub. No.: WO2017/038937
PCT Pub. Date: Mar. 9, 2017

(65) Prior Publication Data
US 2018/0222799 A1    Aug. 9, 2018

(30) Foreign Application Priority Data

Sep. 3, 2015  (JP) ................ 2015-174087
Oct. 19, 2015 (JP) ................ 2015-205328

(51) Int. Cl.
C04B 35/486 (2006.01)
C04B 35/109 (2006.01)
C01F 7/16 (2006.01)
C01F 17/00 (2006.01)
C01G 25/02 (2006.01)

(52) U.S. Cl.
CPC ............ C04B 35/109 (2013.01); C01F 7/162 (2013.01); C01F 17/0025 (2013.01); C01G 25/02 (2013.01); C01P 2002/30 (2013.01); C01P 2002/72 (2013.01); C01P 2004/03 (2013.01); C01P 2004/61 (2013.01)

(58) Field of Classification Search
CPC .............. C04B 35/486; C04B 35/4885
See application file for complete search history.

(56) References Cited

U.S. PATENT DOCUMENTS

| 6,200,916 B1 | 3/2001 | Michel et al. |
| 9,249,057 B2* | 2/2016 | Tsukuma .............. C04B 35/486 |
| 2012/0121859 A1* | 5/2012 | Nahas ................... C04B 35/486 428/148 |
| 2013/0037763 A1 | 2/2013 | Tsukuma |
| 2016/0347666 A1 | 12/2016 | Nagayama et al. |

FOREIGN PATENT DOCUMENTS

| CH | 708 030 A2 | 11/2014 |
| EP | 2 243 756 A1 | 10/2010 |
| JP | 62-83366 | 4/1987 |
| JP | 1-234365 | 9/1989 |
| JP | 7-110785 | 11/1995 |
| JP | 11-322418 | 11/1999 |
| JP | 2000075053 | 3/2000 |
| JP | 2006104024 A * | 4/2006 |
| JP | 2011-207745 | 10/2011 |
| JP | 2016-30717 | 3/2016 |
| WO | 2011/111624 | 9/2011 |
| WO | 2015/099048 A1 | 7/2015 |

OTHER PUBLICATIONS

Machine translation of JP 7-110785 (Year: 1995).*
International Search Report with English Translation in respect to International Application No. PCT/JP2016/075665, dated Oct. 4, 2016.
Communication and European Search Report in EP 16 84 1966 dated Dec. 12, 2018.

* cited by examiner

*Primary Examiner* — Karl E Group
(74) *Attorney, Agent, or Firm* — Greenblum & Bernstein, P.L.C.

(57) ABSTRACT

Provided is a zirconia sintered body that uses coloring of cerium oxide, the zirconia sintered body exhibiting a bright red color. The zirconia sintered body includes an oxide of cerium is an amount of 0.5% by mole or more and less than 4% by mole in terms of $CeO_2$, yttria in an amount of 2% by mole or more and less than 6% by mole, an oxide of aluminum in an amount of 0.1% by weight or more and less than 2% by weight, and the balance being zirconia. The oxide of cerium contains trivalent cerium, and the zirconia has a crystal structure including a tetragonal phase.

8 Claims, 3 Drawing Sheets

RED ZIRCONIA SINTERED BODY AND METHOD FOR MANUFACTURING THE SAME

TECHNICAL FIELD

The present invention relates to a zirconia sintered body that contains cerium oxide and that exhibits a red color. In particular, the present invention relates to a zirconia sintered body that has suitable strength as an exterior member, such as a decorative member, and that exhibits a bright red color.

BACKGROUND ART

For the purpose of use for decorative members and exterior components of electronic device materials, zirconia sintered body containing coloring agents, so-called colored zirconia sintered body has been desired. To date, zirconia sintered body that exhibit reddish color tones have been studied as such colored zirconia sintered body, and cerium oxide ($CeO_2$) has attracted attention as a coloring agent.

For example, zirconia sintered bodies made of tetragonal zirconia that contain $CeO_2$ in an amount of 0.5% by mole or more as a coloring agent and that are obtained by reducing cerium have been reported (PTL 1). These sintered bodies have color tones close to brown, such as orange, brown, and dark red.

A method for manufacturing an orange/red zirconia, the method including firing a zirconia powder that contains a stabilizer such as yttria or ceria in an amount of 3% to 20% by weight, a powder for forming a glass phase in an amount of 0.1% to 5% by weight, and copper oxide in an amount of 0.01% to 10% by weight, has also been reported (PTL 2). The sintered body according to PTL 2 mainly uses coloring due to copper nanoparticles.

Furthermore, a translucent zirconia sintered body has a cubic crystal structure that contains reduced ceria ($Ce_2O_3$) produced by reducing cerium oxide has been reported (PTL 3). The zirconia sintered body according to PTL 3 exhibits a stronger red color tone than zirconia sintered bodies that have been reported as exhibiting red colors.

CITATION LIST

Patent Literature

PTL 1: Japanese Unexamined Patent Application Publication No. 62-83366
2: Japanese Unexamined Patent Application Publication No. 11-322418
3: Japanese Unexamined Patent Application Publication No. 2011-207745

SUMMARY OF INVENTION

Technical Problem

The cerium oxide-containing zirconia sintered bodies reported in PTL 1 and PTL 2 exhibit reddish color tones. However, these color tones each have a color between orange and red, a color between brown and red, or a color between black and red and do not have aesthetic properties of a pure red color.

The zirconia sintered body according to PTL 3 has a very high translucency, and the coloration of the zirconia sintered body is exhibited by transmitted light. The coloration exhibited by transmitted light produces a colored-glass-like translucent color tone, and the color tone significantly changes depending on the thickness of the sintered body. Therefore, when this zirconia sintered body is used as a small member or a thin member, the coloration becomes very weak. Furthermore, since the zirconia sintered body according to PTL 3 has low strength, it is difficult to process the zirconia sintered body, and it is also difficult to use the zirconia sintered body as a large member or a member having a complex shape.

In view of these problems, an object of the present invention is to provide a zirconia sintered body that uses coloring of cerium oxide, the zirconia sintered body exhibiting a bright red color.

Solution to Problem

The inventors of the present invention conducted studies on zirconia sintered bodies that exhibit red colors due to cerium oxide serving as a coloring agent. As a result, it was found that, in a red zirconia sintered body containing cerium oxide as a coloring agent, coexistence of an aluminum compound enables the zirconia sintered body to exhibit a uniform, bright red color. Furthermore, it was found that, in such a zirconia sintered body, a change in the color tone due to the thickness of the sintered body does not occur. These findings led to the completion of the present invention.

Specifically, the gist of the present invention is as follows.
[1] A zirconia sintered body including an oxide of cerium in an amount of 0.5% by mole or more and less than 4% by mole in terms of $CeO_2$; yttria in an amount of 2% by mole or more and less than 6% by mole; an oxide of aluminum in an amount of 0.1% by weight or more and less than 2% by weight; and the balance being zirconia, in which the oxide of cerium contains trivalent cerium, and the zirconia has a crystal structure including a tetragonal crystal.
[2] The zirconia sintered body according to [1], in which the oxide of aluminum includes at least one selected from the group consisting of spinel ($MgAl_2O_4$), lanthanum aluminate ($LaAl_{11}O_{19}$), and aluminum oxide.
[3] The zirconia sintered body according to [1] or [2], in which crystal grains of zirconia have an average crystal grain size of 2 μm or less.
[4] The zirconia sintered body according to any one of [1] to [3], in which a lightness L* is 20 or more, a hue a* is 30 or more, and a ratio of the hue a* to a hue b* satisfies 0.9≤d a*/b*, in an L*a*b* color system.
[5] A method for manufacturing the zirconia sintered body according to any one of [1] to [4], the method including a sintering step of sintering, in a reducing atmosphere, a green body containing yttria in an amount of 2% by mole or more and less than 6% by mole, an oxide of cerium in an amount of 0.5% by mole or more and less than 4% by mole in terms of $CeO_2$, an oxide of aluminum in an amount of 0.1% by weight or more and less than 2% by weight, and the balance being zirconia.
[6] The manufacturing method according to [5], in which the sintering step includes a primary sintering step of subjecting the green body to pressureless sintering to obtain a primary sintered body, and a secondary sintering step of subjecting the primary sintered body to hot isostatic pressing.
[7] The manufacturing method according to [5], in which the sintering step includes a primary sintering step of subjecting the green body to pressureless sintering in an oxidizing atmosphere to obtain a primary sintered body, and a secondary sintering step of subjecting the primary sintered body to pressureless sintering in a reducing atmosphere.

[8] A member including the zirconia sintered body according to any one of [1] to [4].

[9] A zirconia complex sintered body including the zirconia sintered body according to any one of [1] to [4] and a zirconia sintered body containing at least one element selected from the group consisting of Al, Ti, Pr, Nd, Eu, Tb, Ho, Er, Yb, and Gd.

Advantageous Effects of Invention

The present invention can provide a zirconia sintered body that uses coloring of trivalent cerium, the zirconia sintered body exhibiting a bright red color. Furthermore, n the sintered body of the present invention, a change in the color tone due to the thickness of the sintered body is significantly small. Furthermore, the color tone of a surface of the sintered body and the color tone of an inside of the sintered body are uniform. Therefore, the sintered body of the present invention can be used as members that require a red color and that have various shapes and sizes.

DESCRIPTION OF EMBODIMENTS

Figure 1:
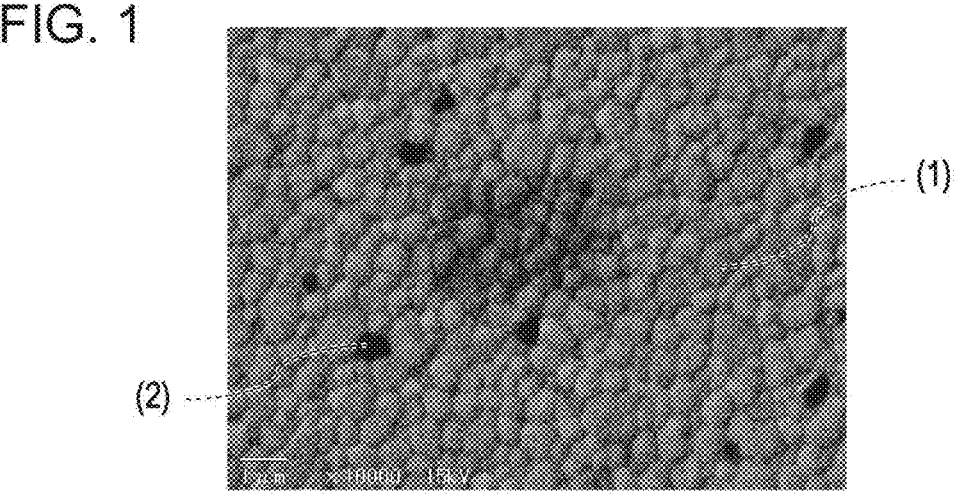
FIG. 1 a scanning electron microscopy image of the zirconia sintered body of Example 7 (the scale in the figure represents 1 μm.

Hereinafter, zirconia sintered bodies of the present invention will be described.

A zirconia sintered body of the present invention (hereinafter, also referred to as a "sintered body of the present invention") contains yttria. Yttrium functions as a stabilizer without coloring zirconia. The content of yttria is 2% by mole or more and less than 6% by mole, preferably 2% by mole or more and 5% by mole or less, and more preferably 2% by mole or more and 4% by mole or less. An yttria content of less than 2% by mole easily causes breakage of the sintered body during manufacturing or under hydrothermal conditions. In contrast, an yttria content of 6% by mole or more decreases the strength of the sintered body. The yttria content may be 2.5% by mole or more and 3.5% by mole or less.

The sintered body of the present invention may contain a compound that functions as a stabilizer without coloring zirconia, for example, at least either calcia or magnesia.

The sintered body of the present invention contains an oxide of cerium. Cerium functions as a stabilizer of zirconia and exhibits a reddish color by converting to trivalent cerium ($Ce^{3+}$) in zirconia. The content of the oxide of cerium in the sintered body of the present invention is 0.5% by mole or more and less than 4% by mole, further 0.5% by mole or more and 3% by mole or less, and still further 0.5% by mole or more and 2.5% by mole or less, in terms of $CeO_2$. When the content of the oxide of cerium is less than 0.5% by mole, coloration of trivalent cerium is excessively weak, and a reddish color is not obtained. In contrast, when the content of the oxide of cerium is 4% by mole or more, the sintered body is tinged with black, and thus a bright red sintered body is not obtained. A particularly preferred content of the oxide of cerium is 0.6% by mole or more and 1.6% by mole or less, and further 0.6% by mole or more and 1.2% by mole or less.

The content (% by mole) of the oxide of cerium can be calculated by $CeO_2/(ZrO_2+Y_2O_3+CeO_2+Al_2O_3)$.

The sintered body of the present invention contains trivalent cerium ($Ce^{3+}$). With an increase in the content of trivalent cerium, the color tone of the zirconia sintered body becomes close to a red color. Therefore, the oxide of cerium contained in the sintered body of the present invention preferably has a high content of trivalent cerium. The molar ratio of trivalent cerium to total cerium in the oxide of cerium is preferably 50% or more, more preferably 60% or more, still more preferably 70% or more, and even still more preferably 80% or more.

By firing the sintered body of the present invention in an oxidizing atmosphere at 800° C. or higher, the reaction represented by the formula below is caused, and trivalent cerium is oxidized by the firing in the oxidizing atmosphere.

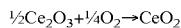

$$\tfrac{1}{2}Ce_2O_3+\tfrac{1}{4}O_2 \to CeO_2$$

Thus, the increase in the weight of the sintered body before and after firing can be regarded as the amount of trivalent cerium contained in the sintered body of the present invention. Therefore, in the present invention, the molar ratio of trivalent cerium can be calculated by the formula below.

$$Ce^{3+}(\% \text{ by mole})=[\{(W_2-W_1)/W_O\}4]/M_{Ce} \times 100.$$

In the formula above, $W_1$ represents a weight (g) of a sintered body of the present invention, $W_2$ represents a weight (g) of the sintered body after being fired is an oxidizing atmosphere, $W_O$ represents an amount of substance of oxygen (32.0 g/mol), and $M_{Ce}$ represents a cerium content (mol) of the sintered body. The conditions for firing in the oxidizing atmosphere to obtain $W_2$ may be conditions which the weight increase of $W_2$ reaches the equilibrium. The preferred firing conditions is pressureless sintering in air at 1,050° C. or higher and 1,400° C. or lower for 1 hour or more and 10 hours or less. The cerium content of the sintered body can be obtained by, for example, composition analysis such as an ICP measurement.

The sintered body of the present invention contains an oxide of aluminum. The oxide of aluminum is present in the form of crystal grains separated from those of zirconia. The crystal grains of the oxide of aluminum can appropriately reflect the coloring of trivalent cerium in the crystal grains of zirconia, since crystal grains of zirconia and crystal grains of the oxide of aluminum coexist in the sintered body of the present invention. Preferably, crystal grains of the oxide of aluminum are not aggregated in the sintered body but are present in an irregularly dispersed state. The coloring of trivalent cerium is complexly reflected by irregularly dispersing of crystal grains of the oxide of aluminum. As a result, the sintered body of the present invention exhibits a uniform, bright red color as a whole and, furthermore, has a stable color tone that is unlikely to change regardless of the thickness. Therefore, not only do the sintered bodies having different thicknesses exhibit the same color tone, but also the color tone of a surface of the sintered body and the color tone of an inside of the sintered body become uniform. As a result, even when the thickness of a sintered body is adjusted by polishing a surface of the sintered body, a change in the color tone before and after the adjustment is unlikely to occur, and thus workability of the sintered body improves. Since crystal grains of the oxide of aluminum are preferably dispersed, in the sintered body of the present invention, crystal grains of the oxide of aluminum do not form grain boundaries.

The oxide of aluminum contained in the sintered body of the present invention preferably has a crystal grain size of 0.5 μm or more and 3 μm or less.

The content of the oxide of aluminum is 0.1% by weight or more and less than 2% by weight and further 0.2% by weight or more and 1.2% by weight or less, in terms of weight ratio of aluminum oxide ($Al_2O_3$), relative to the weight of the sintered body. When the content of the oxide of aluminum is less than 0.1% by weight, the oxide of aluminum cannot be sufficiently dispersed in the sintered body, and the color tone tends to vary between a surface of the sintered body and an inside of the sintered body. Consequently, the resulting sintered body exhibits a color tone that varies depending on the thickness thereof. In contrast, when the content of the oxide of aluminum is 2% by weight or more, the number of crystal grains of the oxide of aluminum in the sintered body becomes excessively too much. As a result, excessive reflection occurs, and the sintered body exhibits a color tone other than red, for example, a color tone ranging from orange to yellow. A preferred content of the oxide of aluminum is, for example, 0.2% by weight or more and 1% by weight or less, further 0.21% by weight or more and 0.8% by weight or less, and still further 0.21% by weight or more and 0.6% by weight or less.

The oxide of aluminum is an oxide containing aluminum and may be any aluminum-containing oxide that has a color tone similar to aluminum oxide (alumina: $Al_2O_3$). The oxide of aluminum contained in the sintered body of the present invention may be at least either a composite oxide containing aluminum or aluminum oxide ($Al_2O_3$); further at least one selected from the group consisting of spinel ($MgAl_2O_4$), lanthanum aluminate ($LaAl_{11}O_{19}$), and aluminum oxide; and still further aluminum oxide.

The sintered body of the present invention may contain impurities as long as the impurities do not substantially affect the color tone. However, the contents of silica and titania in the sintered body of the present invention are each preferably less than 0.1% by weight and more preferably 0.05% by weight or less relative to the weight of the sintered body. Still more preferably, the sintered body of the present invention contains neither silica nor titania. Considering an error in composition analysis, the contents of silica and titania in the sintered body of the present invention are each preferably 0.001% by weight or less. Silica easily forms coarse grains in a sintered body. The coarse grains of silica formed in the sintered body form white spots having a size that can be visually observed. In such a case, a zirconia sintered body having a uniform red color tone is not obtained. In addition, titania exhibits a black color when being sintered in a reducing atmosphere. Therefore, when titania is contained, the resulting sintered body is tinged with black, and thus a zirconia sintered body that exhibits a bright red color is not obtained. It is known that a sintered body is reoxidized to remove blackening of titania. However, in the sintered body of the present invention, trivalent cerium is oxidized by reoxidation. Consequently, the sintered body exhibits a color tone different from a red color, such as an orange color or so.

The sintered body of the present invention has a crystal structure including a tetragonal phase, and a main phase of the crystal structure preferably includes a tetragonal phase. The crystal structure of the sintered body of the present invention may be a mixed phase of a tetragonal phase and a cubic phase. The tetragonal phase has a crystal structure having an optical anisotropy. Since light is easily reflected due to the presence of the tetragonal phase, the sintered body has a color tone that does not have translucency and exhibits a clear red color. Furthermore, when the main phase of the crystal structure includes a tetragonal phase, the sintered body of the present invention has high strength.

The average crystal grain size of zirconia crystal grains of the sintered body of the present invention is preferably 2 μm or less and more preferably 1 μm or less. An average crystal grain size of the zirconia crystal grains of 2 μm or less provides strength enough to be used as a member such as an accessory. The average crystal grain size may be, 0.4 μm or more, and further 0.6 μm or more.

In the present invention, the average crystal grain size of zirconia can be obtained by averaging the crystal grain sizes. The crystal grain size is obtained, by using intercept method, from at least 200 of crystal grain sizes of zirconia crystal grains, observed in a scanning microscope (hereinafter referred to as "SEM") image of the sintered body of the present invention.

The sintered body of the present invention includes crystal grains of zirconia and crystal grains of an oxide of aluminum. The two types of crystal grains can be clearly distinguished from each other in an SEM observation image. FIG. 1 is an SEM observation image of a sintered body of the present invention. In FIG. 1, (1) indicates a crystal grain of zirconia, and (2) indicates a crystal grain of an oxide of aluminum in the SEM observation image, crystal grains of the oxide of aluminum can be observed as crystal grains having a dark color, and the crystal grains of zirconia can be observed as crystal grains having a lighter color than the crystal grains of the oxide of aluminum. Thus, the sintered body of the present invention has a structure in which crystal grains of an oxide of aluminum are dispersed in crystal grains of zirconia.

The sintered body of the present invention is a red zirconia sintered body and exhibits a particularly bright red color. The color tone of the bright red color has a lightness L* of 20 or more, a hue a* of 30 or more, and a ratio of the hue a* to a hue b* (hereinafter, also referred to as "a*/b*"), the ratio satisfying 0.9≤a*/b*, in the L*a*b* color system.

With an increase in the lightness L* value, the color tone becomes brighter. On the other hand, with a decrease in the lightness L* value, the color tone becomes darker. The hue a* represents a color tone ranging from red to green. The larger the a* value, the stronger the red color tone. The smaller the a* value, the stronger the green color tone. On the other hand, the b* value represents a color tone ranging from yellow to blue. The larger the b* value, the stronger the yellow color tone. The smaller the b* value, the stronger the blue color tone. The sintered body of the present invention does not satisfy only one or two of the above lightness L*, hue a*, and a*/b* but satisfies all of the above lightness L*, hue a*, and a*/b*, thereby exhibiting a red color tone rather than a color tone close to red.

Preferred color tones of the sintered body of the present invention may be color tones that satisfy 20≤L*≤60, 30≤a*≤60, and 0.9≤a*/b*; further color tones that satisfy 20≤L*≤40, 30≤a*≤50, and 0.9≤a*/b*≤1.4; and still further color tones that satisfy 20≤L*≤35, 35≤a*≤45, and 0.9≤a*/b*≤1.2. Particularly preferred color tones may be color tones that satisfy 21≤L*≤30, 36≤a*≤45, and 0.9≤a*/b*≤1.1.

The sintered body of the present invention includes crystal grains of an oxide of aluminum, the crystal grains being distributed over the whole sintered body. Therefore, the sintered body of the present invention exhibits the above tightness L*, hue a*, and a*/b* regardless of the shape and the thickness of the sintered body. In addition, the difference in color tone between sintered bodies having different sample thicknesses (hereinafter, also simply referred to as a "difference in color tone") is very small. As a result, even when the sintered body is used as members having different thicknesses, the same aesthetic properties can be provided. Furthermore, the color tone of a surface of the sintered body and the color tone of an inside of the sintered body are uniform. Accordingly, even when the thickness of the sintered body is adjusted by processing, a change in the color tone of the sintered body before and after the processing is reduced, and a change in the aesthetic properties before and after the processing can be thereby reduced. In the sintered body of the present invention, a difference (ΔE*ab) of a color tone, obtained from the formula below, of a sintered body having a sample thickness of 0.5 mm relative to a color tone of a sintered body having a sample thickness of 1 mm, may be 5 or less, further 4 or less, and still further 3 or less.

$$\Delta E^*ab = \{(L_1^* - L_2^*)^2 + (a_1^* - a_2^*)^2 + (b_1^* - b_2^*)^2\}^{1/2}$$

In the above formula, $L_1^*$, $a_1^*$, and $b_1^*$ are respectively L*, a*, and b* of a sintered body sample having a sample thickness of 1 mm, and $L_2^*$, $a_2^*$, and $b_2^*$ are respectively L*, a*, and b* of a sintered body sample having a sample thickness of 0.5 mm.

Considering a measurement error and the like, the ΔE*ab of the sintered body of the present invention is preferably 0.05 or more and 5 or less, more preferably 0.3 or more and 3 or less, still more preferably 0.8 or more and 3 or less, and even still more preferably 1.2 or more and 3 or less. When the ΔE*ab of sintered body samples having different sample thicknesses is about 7, the two samples provide aesthetic properties that exhibit similar color tones but that are different from each other when visually observed. When the ΔE*ab is 5 or less, the difference can be hardly recognized when the sintered body samples are visually observed. The sintered body of the present invention can have a color tone difference that is hardly recognized by visual observation, namely, ΔE*ab≤2.8, further ΔE*ab≤2.0, and still further ΔE*ab≤1.8.

The difference in color tone between the sintered bodies of the present invention varying in sample thickness of 0.5 mm is very small. Therefore, it is believed that substantially all light is reflected in a region of a sintered body extending 0.5 mm from the surface toward the inside of the sintered body in the thickness direction. Accordingly, the above-described difference in color tone may be the difference in color tone between a sintered body having a sample thickness of 1.0 mm in the as-sintered state and a sintered body having a sample thickness of 0.5 mm in the as-sintered state. Alternatively, the above-described difference in color tone may be the difference in color tone of a sintered body before and after a surface of the sintered body is polished by 0.5 mm in the depth direction, more specifically, may be the difference in color tone of a sintered body between the surface and inside of the sintered body, the inside being located at a depth of 0.5 mm from the surface.

The sintered body of the present invention exhibits a bright red color due to light reflected at a surface of the sintered body. Accordingly, the stronger the reflected light, the brighter the red coloring. In the present invention, in particular, a sintered body having a higher reflectance ratio for light other than light having a wavelength absorbed by trivalent cerium exhibits a bright red color more easily. Therefore, the sintered body of the present invention preferably has a reflectance ratio for light having a wavelength of 720 nm of preferably 30% or more, more preferably 35% or more, and still more preferably 40% or more. Considering scattering and attenuation of light incident on the sintered body, the sintered body of the present invention may have a reflectance ratio for light having a wavelength of 720 nm of 30% or more and 60% or less, further 20% or more and 50% or less, and still further 25% or more and 45% or less.

In the present invention, the color tone and the reflectance ratio can be measured by the methods according to JIS Z8722. The color tone and the reflectance ratio may be obtained by the SCE method in which specular reflection that is excluded and diffusion reflection light is measured. In this case, the color tone and the reflectance ratio can be evaluated in a state closer to a state of visual observation.

The sintered body of the present invention preferably has a biaxial flexural strength of 600 MPa or more, more preferably 700 MPa or more, still more preferably 1,000 MPa or more, and even still more preferably 1,200 MPa or more. From the viewpoint of use as various members and workability, the biaxial flexural strength may be 2,500 MPa or less, and further 2,200 MPa or less. A particularly preferred biaxial flexural strength may be 800 MPa or more and 1,800 MPa or less, and further 1,000 MPa or more and 1,650 MPa or less.

The biaxial flexural strength in the present invention can be measured by the method according to ISO/DIS 6872. The biaxial flexural strength is preferably measured. In accordance with ISO/DIS 6872 under the condition of a sample thickness of 1 mm.

The sintered body of the present invention may have a three-point flexural strength of 1,000 MPa or more and 1,500 MPa or less, and further 1,200 MPa or more and 1,500 MPa or less.

The three-point flexural strength in the present invention can be measured by the method according to JIS R 1601.

In order to realize a sintered body having better aesthetic properties, the sintered body of the present invention may be a zirconia complex sintered body (hereinafter, also simply referred to as a "complex sintered body") that includes the sintered body of the present invention and a zirconia sintered body having a composition different from the composition of the sintered body of the present invention.

The complex sintered body preferably has an interface between the sintered body of the present invention and the sintered body having a different composition (hereinafter, also referred to as a "color sintered body"). The complex sintered body has a crystal grain structure in which the sintered body of the present invention and the color sintered body are sintered, that is, crystal grains of the sintered body of the present invention and crystal grains of the color sintered body are bonded together. This structure forms an interface. When such zirconia sintered bodies having different color tones form an interface, the interface functions as a bonding surface that is free from defects such as cracks and distortions. Consequently, the interface does not become a starting point of breakage. Thus, the complex sintered body can also be used as a member that is required to have the strength intrinsic to a zirconia sintered body.

As described above, the complex sintered body is different from a product obtained by bonding the sintered body of the present invention to a color sintered body with a bonding material, or a product obtained by combining the two sintered bodies by a physical method such as fitting.

The interface in the present invention can be confirmed by an electron image obtained by electron microscopy using a SEM or the like, or by observation with an optical microscope. The sintered body of the present invention and the color sintered body have different color tones. In optical microscopy, the interface can be confirmed by a portion where the color tone is changed. Furthermore, the sintered body of the present invention and the color sintered body contain different coloring components. Since electron images have different color tones due to the difference in coloring components, the interface can be confirmed by a portion where the color tone is changed.

Figure 2:
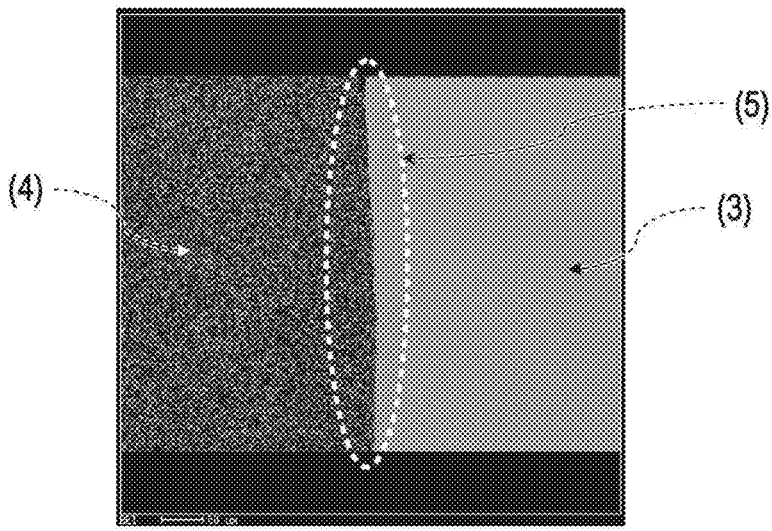
FIG. 2 a scanning electron microscopy image of an interface of the zirconia complex sintered body of Example 23.

FIG. 2 is a view showing an example of a secondary electron image obtained by SEM observation of a complex sintered body. In FIG. 2, (3) indicates a region of a sintered body of the present invention, and (4) indicates a region of a color sintered body. An interface (5) (the circle in FIG. 2) which is a boundary portion between the region indicated by (3) and the region indicated by (4) can be confirmed by the difference in color tone in a backscattered electron image.

Preferably, the complex sintered body does not have a space (hereinafter, also referred to as a "gap") at the interface and near the interface, the gap being capable of being observed by either one electron image of a secondary electron image or a backscattered electron image obtained by SEM observation at a magnification of 500 or less, or by optical microscopy. When the complex sintered body does not have a gap, breakage starting from the interface is unlikely to occur, and mechanical strength of the complex sintered body is easily increased.

In order to exhibit a high-grade appearance, preferably, the complex sintered body does not have a portion that exhibits a color tone in which the color tone of the sintered body of the present invention and the color tone of the color sintered body are mixed (hereinafter, also referred to as "color bleeding"), the portion being capable of being observed either visually or with an optical microscope.

The complex sintered body preferably has a pattern formed by either one zirconia sintered body of the sintered body of the present invention or the color sintered body on a surface of the other zirconia sintered body. The pattern is formed by exposure on the same surface of interface between the sintered body of the present invention and the color sintered body, the sintered body of the present invention and the color sintered body. The complex sintered body can form a finer pattern than existing patterns. As a result, not only is designability further improved, but also it is possible to provide a complex sintered body capable of being formed into a member used in wider applications.

In the present invention, the term "pattern" refers to a diagrammatic drawing, a figure, or a combination thereof that is formed on a part of either one zirconia sintered body of the sintered body of the present invention or the color sintered body by the other zirconia sintered body. Specific examples of the diagrammatic drawing include line shapes such as a solid line, a broken line, and a wavy line; numerals; and letters. Specific examples of the figures include geometric shapes such as a circular shape and a polyhedral shape.

The complex sintered body is not limited as long as the interface between the sintered body of the present invention and the color sintered body, the sintered body of the present invention and the color sintered body are exposed on the same surface to form a pattern. The color sintered body may form a pattern on a surface of the sintered body of the present invention. Alternatively, the sintered body of the present invention may form a pattern on a surface of the color sintered body.

The complex sintered body may be a zirconia sintered body having a pattern, wherein the zirconia sintered body containing a sintered body of the present invention and a color sintered body, being sintering to form an interface by laminating a concave-convex portion of the sintered body of the present invention and the color sintered body, and having an exposing structure of a cross section of the lamination portion of concave-convex portion on the same surface.

Furthermore, by being an arbitrary shape and size of concavo-convex portion of the sintered body of the present invention and the color sintered body, it is able to express arbitrary shape and size.

The color sintered body included in the complex sintered body is a zirconia sintered body having a composition different from that of the sintered body of the present invention and is a zirconia sintered body having a color tone different from that of the sintered body of the present invention. The sintered body of the present invention contains trivalent cerium, that is, cerium in the reduced state. Accordingly, the color sintered body preferably contains an element having a high coloring reproducibility in the reduced state, as a coloring agent. Preferred examples of the color sintered body include a zirconia sintered body containing at least one element. (hereinafter, also referred to as a "coloring element") selected from the group consisting of Al, Ti, Pr, Nd, Eu, Tb, Ho, Er, Yb, and Gd. For example, Al exhibits a white color, Ti exhibits a black color, Pr exhibits a green color, Er exhibits a pink color, and Eu exhibits a white color to a light yellow color, when exposed to a reducing atmosphere. Examples of particularly preferred color sintered body includes zirconia sintered body containing at least one element selected from the group consisting of Al, Ti, and Eu. Examples of more specific color sintered body includes zirconia sintered bodies containing at least one selected from the group consisting of barium magnesium aluminate containing europium, strontium acclimate containing europium, calcium aluminate containing europium, alumina, and titanic.

The complex sintered body comprises a color sintered body containing a coloring element and a sintered body of the present invention, has aesthetic properties with a high-grade appearance. In addition, it is easy to achieve a high reproducibility of the color tone in manufacturing of this complex sintered body. Accordingly, a complex sintered body more suitable for industrial manufacturing can be provided.

The color sintered body may contain the coloring element in an amount of 0% by weight or more and 40% by weight or less, further, 0% by weight or more and 10% by weight or less, still further, 0% by weight or more and 5% by weight or less, and even still further, more than 0% by weight and 5% by weight or less, in terms of oxide.

The color sintered body may contain a compound that functions as a stabilizer without coloring zirconia, for example, at least one selected from the group consisting of yttria, calcia, and magnesia. The content of the stabilizer is preferably 2% by mole or more and less than 6% by mole, more preferably 2% by mole or more and 5% by mole or less, and still more preferably 2% by mole or more and 4% by mole or less.

An example of a particularly preferred complex sintered body is a zirconia complex sintered body comprising a zirconia sintered body of the present invention and a zirconia sintered body containing at least one element selected from the group consisting of Al, Ti, Pr, Nd, Eu, Tb, Ho, Er, Yb, and Gd.

Next, a method for manufacturing a sintered body of the present invention will be described.

The sintered body of the present invention can be manufactured by a method for manufacturing a zirconia sintered body, the method including a sintering step of sintering, in a reducing atmosphere, a green body (hereinafter, also referred to as a "red green body") containing yttria in an amount of 2% by mole or more and less than 6% by mole, an oxide of cerium in an amount of 0.5% by mole or more and less than 4% by mole in terms of $CeO_2$, and an oxide of aluminum in an amount of 0.1% by weight or more and less than 2% by weight, and the balance being zirconia.

The red green body provided to the sintering step contains yttria in an amount of 2% by mole or more and less than 6% by mole, an oxide of cerium in an amount of 0.5% by mole or more and less than 4% by mole in terms of $CeO_2$, and an oxide of aluminum in an amount of 0.1% by weight or more and less than 2% by weight, and the balance being zirconia. A more preferred red green body has a composition that contains yttria in an amount of 2% by mole or more and 4% by mole or less, an oxide of cerium in an amount of 0.5% by mole or more and 1.5% by mole or less in terms of $CeO_2$, and an oxide of aluminum in an amount of 0.1% by weight or more and 1% by weight or less, and the balance being zirconia.

The red green body may have any shape. The shape may be at least one selected from the group consisting of a disk shape, a pillar shape, a plate-like shape, a spherical shape, and a substantially spherical shape.

The red green body is obtained by mixing raw material powders containing yttria, an oxide of cerium, an oxide of aluminum, and zirconia in the above composition by any method, and molding the resulting mixed powder.

The raw material powder of zirconia is preferably an easily sinterable powder. Examples of physical properties of a preferred raw material powder of zirconia include a content of yttria in the range of 2% by mole or more and less than 6% by mole, a BET specific surface area of 5 $m^2/g$ or more and 20 $m^2/g$ or less, and further 5 $m^2/g$ or more and 17 $m^2/g$ or less, and a purity of 99.6% or more, and further 99.8% or more.

The raw material powder of an oxide of cerium preferably has an average particle size of 3 μm or less, more preferably 2 μm or less, and still more preferably 1 μm or less. A particularly preferred raw material powder of an oxide of cerium may be a cerium oxide powder, further a cerium oxide powder having a purity of 99% or more, and still further a cerium oxide powder having a purity of 99.9% or more.

The raw material powder of an oxide of aluminum is preferably a powder having at least either a substantially spherical shape or a plate-like shape. A raw material powder, having such a shape, of an oxide of aluminum, is not aggregated and is easily irregularly dispersed in the red green body. When the raw material powder of an oxide of aluminum has a substantially spherical shape, the average particle size of the raw material powder is preferably 1 μm or less and more preferably 0.5 μm or less. When the raw material powder of an oxide of aluminum has a plate-like shape, the thickness of the raw material powder is preferably 0.5 μm or less and more preferably 0.3 μm or less, and a ratio of the thickness to the major diameter (thickness/major diameter) is preferably 0.1 or less and more preferably 0.06 or less. An example of the plate-like shaped raw material powder of an oxide of aluminum is an aluminum oxide powder having a major diameter of 1 μm or more and 3 μm or less and a thickness of 0.05 μm or more and 0.2 μm or less.

The red green body provided to the sintering step is preferably obtained by molding a mixed powder prepared by mixing these raw material powders.

The method for mixing the raw material powders may be any method as long as yttria, zirconia, cerium oxide, and an oxide of aluminum are sufficiently mixed to obtain a mixed powder. A preferred mixing method may be wet mixing, and further a mixing method using at least either a ball mill or a stirring mill. A more preferred mixing method is a method including grinding and mixing a slurry prepared by mixing either water or an alcohol, yttria, zirconia, cerium oxide, and an oxide of aluminum.

The method for molding a mixed powder is not limited as long as the mixed powder can be molded into a desired shape. The method may be at least one selected from the group consisting of die pressing, cold isostatic pressing, slip casting, and injection molding. At least either die pressing or cold isostatic pressing is preferred.

In the sintering step, the red green body is sintered in a reducing atmosphere. By conducting sintering in a reducing atmosphere, the oxide of cerium contained in the red green body is reduced, and densification of the resulting zirconia sintered body proceeds. As a result, a zirconia sintered body that exhibits a bright red color is obtained.

The sintering is conducted under the conditions in which generation of trivalent cerium proceeds in the oxide of cerium and the relative density of the sintered body reaches 99% or more. Such sintering is conducted, for example, in a reducing atmosphere at 1.400° C. or higher and 1,600° C. or lower.

The relative density of the sintered body can be obtained from the measured density and the theoretical density by using the formula below.

$$\text{Relative density (\%)} = \text{measured density (g/cm}^3\text{)}/\text{theoretical density (g/cm}^3\text{)} \times 100$$

The measured density may be measured by the Archimedes method. The theoretical density of the sintered body can be determined by the formula below.

$$\text{Theoretical density (g/cm}^3\text{)} = \rho_{Zr} \times V_{Zr} + \rho_{Al} \times V_{Al} + \rho_{Ce} \times V_{Ce}$$

In the above formula, $\rho_{Zr}$ represents a theoretical density (g/cm$^3$) of zirconia, $\tau_{Al}$ represents a theoretical density (198 g/cm$^3$) of aluminum oxide, and $\rho_{Ce}$ represents a theoretical density (7.22 g/cm$^3$) of cerium oxide. $V_{Zr}$, $V_{Al}$, and $V_{Ce}$ respectively represent volume ratios of zirconia, aluminum oxide, and cerium oxide in the sintered body and can be determined by the formulae below.

$$V_{Zr} = (W_{Zr}/\rho_{Zr})/(W_{Zr}/\rho_{Zr} + W_{Al}/\rho_{Al} + W_{Ce}/\rho_{Ce})$$

$$V_{Al} = (W_{Al}/\rho_{Al})/(W_{Zr}/\rho_{Zr} + W_{Al}/\rho_{Al} + W_{Ce}/\rho_{Ce})$$

$$V_{Ce} = (W_{Ce}/\rho_{Ce})/(W_{Zr}/\rho_{Zr} + W_{Al}/\rho_{Al} + W_{Ce}/\rho_{Ce})$$

Note that $W_{Zr}$ represents the weight of zirconia, $W_{Al}$ represents the weight of aluminum oxide, and $W_{Ce}$ represents the weight of cerium oxide. The values below are used as the theoretical density ($\rho_{Zr}$) of zirconia.

2 mol % $Y_2O_3$-containing zirconia: 6.11 g/cm$^3$
3 mol % $Y_2O_3$-containing zirconia: 6.09 g/cm$^3$
4 mol % $Y_2O_3$-containing zirconia: 6.08 g/cm$^3$ The sintering step is preferably a sintering step including a primary sintering step of subjecting a red green body to pressureless sintering to obtain a primary sintered body, and a secondary sintering step of sintering the primary sintering body in a reducing atmosphere (hereinafter, also referred to as a "two-step sintering process"). By causing densification prior to the generation of trivalent cerium, a sintered body can be manufactured at high productivity.

An example of the two-step sintering process, which is a preferred sintering step, is a sintering step including a primary sintering step of subjecting a red green body to pressureless sintering to obtain a primary sintered body, and a secondary sintering step of subjecting the primary sintered body to hot isostatic pressing (hereinafter, also referred to as "HIP") (hereinafter, also referred to as a "pressure sintering method"). In the pressure sintering method, it is preferable to moderately density the sintered body in the primary sintering step, and to eliminate remaining pores and to generate trivalent cerium in the secondary sintering step.

In the primary sintering step in the pressure sintering method, a red green body is subjected to pressureless sintering. A primary sintered body to be provided to HIP is thereby obtained. The term "pressureless sintering" refers to a method. In which a compact is sintered by simply heating the green body without applying external force to the green body during sintering.

In the primary sintering step, the red green body is preferably sintered under the conditions in which the resulting primary sintered body has a relative density of 95% or more and the crystal grains of zirconia have an average crystal grain size of 2 µm or less. In such a primary sintered body, densification is easily accelerated by the subsequent HIP.

The primary sintered body preferably has a relative density of 95% or more, more preferably 97% or more, and still more preferably 99% or more. Note that the relative density of the primary sintered body may be 100% or less. Even when the relative density is 100% according to calculations, fine pores remain in the sintered body. Such remaining pores can be eliminated in the secondary sintering step. The average crystal grain size of the crystal grains of zirconia of the primary sintered body is preferably 2 µm or less, more preferably 1.5 µm or less, and still more preferably 1 µm or less.

Conditions for the primary sintering step of obtaining a primary sintered body to be provided to the HIP may be conditions described below.

Primary sintering temperature: 1,250° C. or higher and 1,600° C. or lower, and further 1,300° C. or higher and 1,500° C. or lower Sintering atmosphere: at least one selected from the group consisting of an oxidizing atmosphere, a reducing atmosphere, and a vacuum atmosphere, further an oxidizing atmosphere, and still further an air atmosphere Furthermore, in the primary sintering, the temperature-increasing rate from 1,000° C. to the primary sintering temperature is preferably 250° C./h or less, and more preferably 200° C./h or less. When the temperature-increasing rate of 1,000° C. or higher is 250° C./h or less, pores in the red green body are easily eliminated. A more preferred temperature-increasing rate may be 100° C./h or less, and further 50° C./h or less.

Furthermore, after holding at the primary sintering temperature, the temperature-decreasing rate from the primary sintering temperature to 1,000° C. is preferably 50° C./h or more, and more preferably 100° C./h or more. When the temperature-decreasing rate down to 1,000° C. is within this range, sintering due to remaining heat is unlikely to proceed in the primary sintering step. As a result, the crystal grain size easily becomes uniform.

In the secondary sintering step in the pressure sintering method, HIP is conducted under the conditions in which elimination of residual pores in the primary sintered body and generation of trivalent cerium are conducted at the same time.

The temperature of the HIP is preferably 1,300° C. or higher and lower than 1,475° C., more preferably 1,350° C. or higher and 1,450° C. or lower, and still more preferably 1,350° C. or higher and 1,400° C. or lower. At a temperature of 1,350° C. or higher, trivalent cerium is easily generated. On the other hand, when the temperature of the HIP is lower than 1,475° C., blackening due to reduction of zirconia is unlikely to occur. In the pressure sintering method, the temperature of the HIP may be equal to or lower than the primary sintering temperature, or the temperature of the HIP may be lower than the primary sintering temperature.

The pressure of the HIP is preferably 50 MPa or more and 200 MPa or less, and more preferably 100 MPa or more and 175 MPa or less. At a pressure of 50 MPa or more, removal of grain boundary pores from the primary sintered body is accelerated. On the other hand, at a pressure of 200 MPa or less, densification of the zirconia sintered body proceeds.

The HIP is conducted in a reducing atmosphere. Trivalent cerium is thereby generated. The reducing atmosphere may include a pressure medium containing a reducing gas, for example, at least either hydrogen or carbon monoxide. Alternatively, a non-oxidizing gas may be used as the pressure medium, and the primary sintered body may be placed in a reducing container and a reducing heating source to form a reducing atmosphere. The non-oxidizing gas may be at least either argon or nitrogen. Examples of the reducing container and the reducing heating source include a graphite container and a carbon heater.

In order to conduct the HIP in a reducing atmosphere, the primary sintered body is preferably arranged in a reducing container. An example of the reducing container is a container with a lid, the container and lid being made of carbon and having air holes. By using an air-permeable container, a very small amount of oxygen present in the vicinity of the primary sintered body is removed to accelerate generation of trivalent cerium.

Another example of the two-step sintering process is a sintering step including a primary sintering step of subjecting a red green body to pressureless sintering in an oxidizing atmosphere to obtain a primary sintered body, and a secondary sintering step of subjecting the primary sintered body to pressureless sintering in a reducing atmosphere (hereinafter, also referred to as "pressureless reduction method"). In the pressureless reduction method, preferably, the sintered body is densified in the primary sintering step, and trivalent cerium is generated in the secondary sintering step.

The pressureless reduction method is suitable for industrial application because this method can provide the sintered body of the present, invention by using simple equipment compared with the pressure sintering method.

In the primary sintering step in the pressureless reduction method, a red green body is subjected to pressureless sintering in an oxidizing atmosphere. As a result, a primary sintered body to be provided to pressureless sintering in a reducing atmosphere (hereinafter, also referred to as "reduction pressureless sintering") is obtained.

In the primary sintering step, the red green body is preferably sintered under the conditions in which the resulting primary sintered body has a relative density of 97% or more and crystal grains of zirconia have an average crystal grain size of 2 μm or less. In such a primary sintered body, generation of trivalent cerium is easily accelerated by the subsequent reduction pressureless sintering.

The relative density of the primary sintered body is preferably as high as possible. The relative density is preferably 97% or more, more preferably 99% or more, and still more preferably 99.5% or more. The relative density of the primary sintered body may be 100% or less. The average crystal grain size of zirconia crystal grains of the primary sintered body is preferably 2 μm or less, more preferably 1.5 μm or less, and still more preferably 1 μm or less.

Conditions for the primary sintering step of obtaining a primary sintered body to be provided to the reduction pressureless sintering may be conditions described below.

Primary sintering temperature: 1,425° C. or higher and 1,650° C. or lower, and
further 1,450° C. or higher and 1,600° C. or lower
Sintering atmosphere: an oxidizing atmosphere, and further an air atmosphere Furthermore, in the primary sintering, the temperature-increasing rate from 1,000° C. to the primary sintering temperature is preferably 250° C./h or less and more preferably 200° C./h or less. When the temperature-increasing rate of 1,000° C. or higher is 250° C./h or less, pores in the red green body are easily eliminated. A more preferred temperature-increasing rate may be 100° C./h or less, and further 50° C./h or less.

Furthermore, after holding at the primary sintering temperature, the temperature-decreasing rate from the primary sintering temperature to 1,000° C. is preferably 50° C./h or more, and more preferably 100° C./h or more. When the temperature-decreasing rate down to 1,000° C. is within this range, sintering due to remaining heat is unlikely to proceed in the primary sintering step. As a result, the crystal grain size easily becomes uniform.

In the secondary sintering step in the pressureless reduction method, sintering is performed under the conditions in which generation of trivalent cerium of the primary sintered body proceeds.

The sintering temperature is preferably 1,350° C. or higher, and more preferably 1,400° C. or higher. At a temperature of 1,350° C. or higher, trivalent cerium is easily generated. On the other hand, when the sintering temperature is 1,600° C. or lower, and further 1,550° C. or lower, reduction of trivalent cerium sufficiently proceeds without occurrence of excessive grain growth. Since the generation of trivalent cerium is simply conducted in the pressureless reduction method, the temperature of reduction pressureless sintering may be equal to or lower than the primary sintering temperature, or the temperature of the reduction pressureless sintering may be lower than the primary, sintering temperature.

The sintering of the secondary sintering step in the pressureless reduction method is conducted in a reducing atmosphere. Trivalent cerium is thereby generated. Examples of the reducing atmosphere include a hydrogen-containing atmosphere and a carbon monoxide-containing atmosphere. The reducing atmosphere is preferably a nitrogen atmosphere containing at least either hydrogen or carbon monoxide, or an argon atmosphere containing at least either hydrogen or carbon monoxide. The reducing atmosphere is more preferably a hydrogen-containing nitrogen atmosphere or a hydrogen-containing argon atmosphere. The content of hydrogen or carbon monoxide in any of these preferred reducing atmospheres is not limited as long as a reducing atmosphere is obtained in which generation of trivalent cerium proceeds, and may be 1% by volume or more and 10% by volume or less.

Preferably, the manufacturing method of the present invention does not comprise a step of conducting sintering in an oxidizing atmosphere after the sintering step. In the manufacturing method of the present invention, a red green body is sintered in a reducing atmosphere, thereby generating trivalent cerium. In sintering of a zirconia sintered body in a reducing atmosphere by HIP or the like, the sintered body may be tinged with black due to reduction of zirconia. The blackish tinge is usually removed by conducting sintering in an oxidizing atmosphere after sintering in the reducing atmosphere, that is, by conducting a so-called annealing treatment. However, the sintered body obtained by the manufacturing method of the present invention exhibits a bright red color due to trivalent cerium. If the annealing treatment is conducted, trivalent cerium is also oxidized together with zirconia. Consequently, trivalent cerium is changed to tetravalent cerium, and the sintered body after the annealing treatment cannot exhibit a bright red color.

In the case of manufacturing a complex sintered body comprising a color sintered body and a sintered body of the present invention, a green body to be provided to the sintering step may be a complex green body that comprises a red green body and a green body having a composition different from the composition of the red green body (hereinafter, also referred to as a "color green body").

Examples of preferred color green body include a zirconia green body containing at least one element (coloring element) selected from the group consisting of Al, Ti, Pr, Nd, Eu, Tb, Ho, Er, Yb, and Gd, Examples of particularly preferred color green body include zirconia green body containing at least one element selected from the group consisting of Al, Ti, and Eu. Examples of more specific color green body includes a zirconia green body containing at least one selected from the group consisting of barium magnesium aluminate containing europium, strontium aluminate containing europium, calcium aluminate containing europium, alumina, and titania.

By sintering the complex green body comprising a color green body containing a coloring element and a red green body at the same time, a complex sintered body having a homogeneous texture and aesthetic properties with a high-grade appearance can be obtained.

The color green body may contain the coloring element in an amount of 0% by weight or more and 40% by weight or less, further, 0% by weight or more and 10% by weight or less, still further, 0% by weight or more and 5% by weight or less, and even still further, more than 0% by weight and 5% by weight or less, in terms of oxide.

The color green body may contain a compound that functions as a stabilizer without coloring zirconia, for example, at least one selected from the group consisting of yttria, calcia, and magnesia. The content of the stabilizer is preferably 2% by mole or more and less than 6% by mole, more preferably 2% by mole or more and 5% by mole or less, and still more preferably 2% by mole or more and 4% by mole or less.

The complex green body is a green body that is molded such that the red green body and the color green body are in contact with each other. The complex green body is preferably a green body obtained by preparing one of the red green body and the color green body, and molding the other green body on the one green body.

Examples of the complex green body include a complex green body obtained by preparing a color green body, filling a space on the green body with a raw material of a red green body and molding the two at the same time; a complex green body obtained by preparing a red green body, filling a space on the compact with a raw material of a color green body and molding the two at the same time; and a complex green body obtained by filling a forming die with a raw material of one of the green bodies, filling a space on the raw material with a raw material of the other green body and molding the two raw materials at the same time.

The complex green body may have any shape. The shape may be at least one selected from the group consisting of a disk shape, a pillar shape, a plate-like shape, a spherical shape, and a substantially spherical shape. A pattern, such as a letter or a diagrammatic drawing, may be formed by providing concave-convex portion on one of the red green body and the color green body, and molding the other green body on such concave-convex portion.

The complex sintered body obtained after the sintering step may be processed by any method to obtain a member including the sintered body of the present invention or a member including the complex sintered body of the present invention.

EXAMPLES

The present invention will now be specifically described by way of Examples. However, the present invention is not limited to the Examples.

Methods for measuring characteristics of powders and sintered bodies of the present invention will be described below.

(Measurement of Measured Density)

The measured density of a sintered body was measured by the Archimedes method.

(Measurement of Relative Density)

The relative density of a sintered body was determined from the measured density and the theoretical density by using the formula below.

Relative density (%)=measured density (g/cm$^3$)/theoretical density (g/cm$^3$)×100

The theoretical density of a sintered body was determined by the formula below.

Theoretical density (g/cm$^3$)=$\rho_{Zr} \times V_{Zr} + \rho_{Al} \times V_{Al} + \rho_{Ce} \times V_{Ce}$ In the above formula, $\rho_{Zr}$ represents a theoretical density (g/cm$^3$) of zirconia, $\rho_{Al}$ represents a theoretical density (3.98 g/cm$^3$) of aluminum oxide, and $\rho_{Ce}$ represents a theoretical density (7.22 g/cm$^3$) of cerium oxide. $V_{Zr}$, $V_{Al}$, and $V_{Ce}$ respectively represent volume ratios of zirconia, aluminum oxide, and cerium oxide in the sintered body and were determined by the formulae below.

$V_{Zr}=(W_{Zr}/\rho_{Zr})/(W_{Zr}/\rho_{Zr}+W_{Al}/\rho_{Al}+W_{Ce}/\rho_{Ce})$ $V_{Al}=(W_{Al}/\rho_{Al})/(W_{Zr}/\rho_{Zr}+W_{Al}/\rho_{Al}+W_{Ce}/\rho_{Ce})$ $V_{Ce}=(W_{Ce}/\rho_{Ce})/(W_{Zr}/\rho_{Zr}+W_{Al}/\rho_{Al}+W_{Ce}/\rho_{Ce})$ Note that $W_{Zr}$ represents the weight of zirconia, $W_{Al}$ represents the weight of aluminum oxide, and $W_{Ce}$ represents the weight of cerium oxide. The values below were used as the theoretical density of zirconia.

2 mol % $Y_2O_3$-containing zirconia: 6.11 g/cm$^3$
3 mol % $Y_2O_3$-containing zirconia: 6.09 g/cm$^3$
4 mol % $Y_2O_3$-containing zirconia: 6.08 g/cm$^3$ (Measurement of Color Tone and Reflectance Ratio)

The color tone of a sintered body sample was measured by the method according to JIS Z8722. A typical color-difference meter (device name: Spectrophotometer SD 3000, available from Nippon Denshoku Industries Co., Ltd.) was used in the measurement. Under the measurement conditions described below, the color tone and the reflectance ratio were determined by the SCE method in which specular reflection light is excluded and diffusion reflection light is measured.

Light source: D65 light source
Viewing angle: 10°

The sintered body sample used was a sintered body having a thickness of 0.5 mm or 1 mm and prepared by mirror-polishing two surfaces thereof so as to have a surface roughness Ra 0.02 μm or less.

Furthermore, a reflectance ratio of the sintered body sample having a sample thickness of 1 mm for light having a wavelength of 720 nm was defined as the value of the reflectance ratio.

(Difference in Color Tone)

The difference in color tone due to the difference in sample thickness was determined from a color tone of a sample having a sample thickness of 0.5 mm and a color tone of a sample having a sample thickness of 1 mm, the color tones being measured under the conditions described above. In the measurement, the color tone of the sintered body sample having a sample thickness of 1 mm was measured, a surface of the sample was then polished by 0.5 mm to adjust the sample thickness to 0.5 mm, and the color tone of the resulting sample was measured. The difference in color tone was calculated by the formula below.

$$\Delta E^*ab=\{(L_1^*-L_2^*)+(a_1^*-a_2^*)^2+(b_1^*-b_2^*)^2\}^{1/2}$$

In the above formula, $L_1^*$, $a_1^*$, and $b_1^*$ are respectively $L^*$, $a^*$, and $b^*$ of the sintered body sample having a sample thickness of 1 mm, and $L_2^*$, $a_2^*$, and $b_2^*$ are respectively $L^*$, $a^*$, and $b^*$ of the sintered body sample having a sample thickness of 0.5 mm.

(Biaxial Flexural Strength)

The biaxial flexural strength of a sintered body sample was measured by the method according to ISO/DIS 6872. A columnar sintered body sample having a diameter of 16 mm and a thickness of 1 mm was used as the measurement. The measurement was conducted three times for each sintered body sample, and the average of the results was defined as the biaxial flexural strength.

(Three-Point Flexural Strength)

The three-point flexural strength of a sintered body sample was measured by the testing method according to JIS R 1601. A rectangular parallelepiped sintered body sample having dimensions of 3 mm in thickness×4 mm in width×40 mm in length was used in the measurement. The three-point flexural strengths of ten specimens for measurement were measured, and the average thereof was defined as the three-point flexural strength.

(Average Crystal Grain Size)

The average crystal grain size of zirconia crystal grains of a sintered body sample was measured by the intercept method. A sintered body sample after mirror polishing was subjected to thermal etching, and the surface thereof was observed with a scanning microscope at a magnification of 20,000. The average grain size of zirconia crystal grains was measured from the obtained SEM observation image by the intercept method (k=1.78). The number of zirconia crystal grains measured was 200 or more.

Example 1

(Preparation of Raw Material Powder)

49.4 g of a 3 mol % yttria-containing zirconia powder (available from Tosoh Corporation, TZ-3YS; specific surface area 7 m² g, purity 99.8% or more), 0.5 g of a cerium oxide powder having an average particle size of 0.8 µm (purity 99.9%), and 0.13 g of a substantially spherical aluminum oxide powder having an average particle size of 0.3 µm (purity 99.9% or more) were weighed. These powders were mixed with ethanol to prepare a slurry. The resulting slurry was mixed and ground for 24 hours in a ball mill using zirconia balls each having a diameter of 10 mm to prepare a mixed powder. The mixed powder was dried in air at 110° C. and then sieved to obtain a powder having a particle size of 500 µm or less. This powder was used as a raw material powder.

(Primary Sintering)

The raw material powder was molded by die pressing at a pressure of 50 MPa and then subjected to cold isostatic pressing at a pressure of 200 MPa to prepare a columnar green body having a diameter of 20 mm and a thickness of 3 mm. The resulting green body was subjected to primary sintering by sintering at a temperature-increasing rate of 100° C./h in air at a sintering temperature of 1,500° C. for two hours, and the temperature was then decreased at a temperature-decreasing rate of 200° C./h to obtain a primary sintered body. The evaluation results of the resulting primary sintered body are shown in Table 1.

(HIP)

The primary sintered body was placed in a carbon crucible with a lid, and then subjected to HIP at 1,400° C. and 150 MPa for a holding time of one hour. Thus, a zirconia sintered body was obtained. Argon gas having a purity of 99.9% was used as a pressure medium. A HIP apparatus including a carbon heater and a carbon heat insulator was used. The zirconia sintered body of this example exhibited a red color. The evaluation results of the resulting zirconia sintered body are shown in Tables 2 and 3. The red sintered body of this example had a molar ratio of trivalent cerium of 88%.

Example 2

A zirconia sintered body was obtained in the same manner as in Example 1 except that the sintering temperature of the primary sintering was 1,400° C. The evaluation results of the primary sintered body are shown in Table 1, and the evaluation results of the zirconia sintered body are shown in Tables 2 and 3. The red sintered body of this example had a molar ratio of trivalent cerium of 89%.

Example 3

A zirconia sintered body was obtained in the same manner as in Example 1 except that the sintering temperature of the primary sintering was 1,450° C. The evaluation results of the primary sintered body are shown in Table 1, and the evaluation results of the zirconia sintered body are shown in Tables 2 and 3. The red sintered body of this example had a molar ratio of trivalent cerium of 92%.

Example 4

A zirconia sintered body was obtained in the same manner as in Example 1 except that a mixed powder was prepared using 49.2 g of the 3 mol % yttria-containing zirconia powder, 0.5 g of the cerium ox aide powder, and 0.3 g of the aluminum oxide powder. The evaluation results of the primary sintered body are shown in Table 1, and the evaluation results of the zirconia sintered body are shown in Tables 2 and 3. The red sintered body of this example had a molar ratio of trivalent cerium of 88%.

Example 5

A zirconia sintered body was obtained in the same manner as in Example 4 except that the sintering temperature of the primary sintering was 1,400° C. The evaluation results of the primary sintered body are shown in Table 1, and the evaluation results of the zirconia sintered body are shown in Tables 2 and 3. The red sintered body of this example had a molar ratio of trivalent cerium of 81%.

Example 6

A zirconia sintered body was obtained in the same manner as in Example 4 except that the sintering temperature of the primary sintering was 1,450° C. The evaluation results of the primary sintered body are shown in Table 1, and the evaluation results of the zirconia sintered body are shown in Tables 2 and 3. The red sintered body of this example had a molar ratio of trivalent cerium of 81%.

Example 7

A zirconia sintered body was obtained in the same manner as in Example 1 except that a mixed powder was prepared by using 49.0 g of the 3 mol % yttria-containing zirconia powder, 0.5 g of the cerium oxide powder, and 0.5 g of the aluminum oxide powder. The evaluation results of the primary sintered body are shown in Table 1, and the evaluation results of the zirconia sintered body are shown in Tables 2 and 3. The red sintered body of this example had a molar ratio of trivalent cerium of 100%.

FIG. 1 shows an SEM observation image of the zirconia sintered body of this example. In the microstructure of the zirconia sintered body of this example, crystal grains of alumina each had a crystal grain size of 1 µm or less and had a substantially spherical shape. In addition, it was confirmed that grain boundaries due to crystal grains of alumina were not formed. Furthermore, it was confirmed that zirconia had an average crystal grain size of 1 µm or less.

Figure 3:
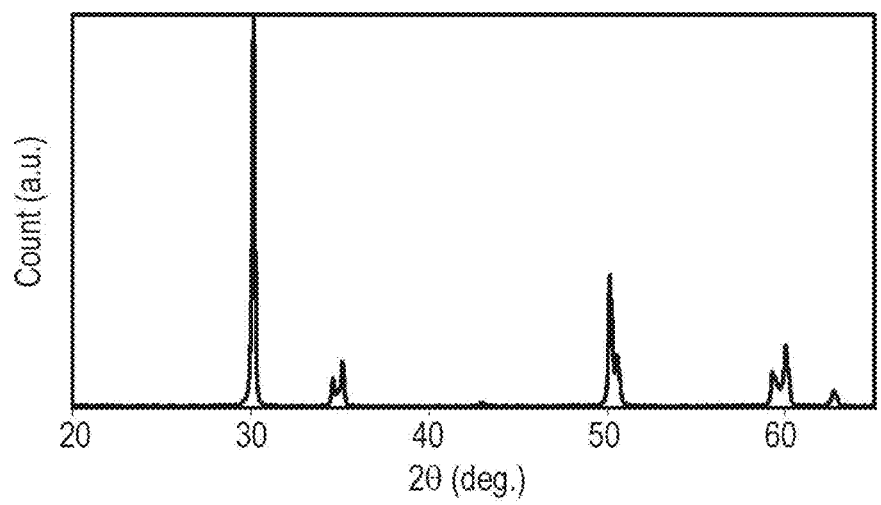
FIG. 3 a powder X-ray diffraction pattern of the zirconia sintered body of Example 7.

FIG. 3 shows an XRD pattern of the zirconia sintered body of this example. The XRD pattern showed that the crystal structure of the zirconia sintered body of this example was a mixed phase of a cubic phase and a tetragonal phase.

Furthermore, FIG. 4(a) shows the reflectance ratio of the zirconia sintered body of this example. The reflectance ratio at a wavelength of 650 nm was 39.7%, and the reflectance ratio at a wavelength of 700 nm was 47.9%, showing that the zirconia sintered body of this example had a high reflectance ratio. The reflectance ratio at a wavelength of 530 nm was 2.4%, and a strong light absorption due to trivalent cerium was confirmed.

Example 8

A zirconia sintered body was obtained in the same manner as in Example 1 except that a mixed powder was prepared by using 48.5 g of the 3 mol % yttria-containing zirconia powder, 1.0 g of the cerium oxide powder, and 0.5 g of the aluminum oxide powder. The evaluation results of the primary sintered body are shown in Table 1, and the evaluation results of the zirconia sintered body are shown in Tables 2 and 3. The red sintered body of this example had a molar ratio of trivalent cerium of 98%.

Example 9

A zirconia sintered body was obtained in the same manner as in Example 1 except that a mixed powder was prepared by using 48.0 g of the 3 mol % yttria-containing zirconia powder, 1.5 g of the cerium oxide powder, and 0.5 g of the aluminum oxide powder. The evaluation results of the primary sintered body are shown in Table 1, and the evaluation results of the zirconia sintered body are shown in Tables 2 and 3. The red sintered body of this example had a molar ratio of trivalent cerium of 93%.

Figure 5:
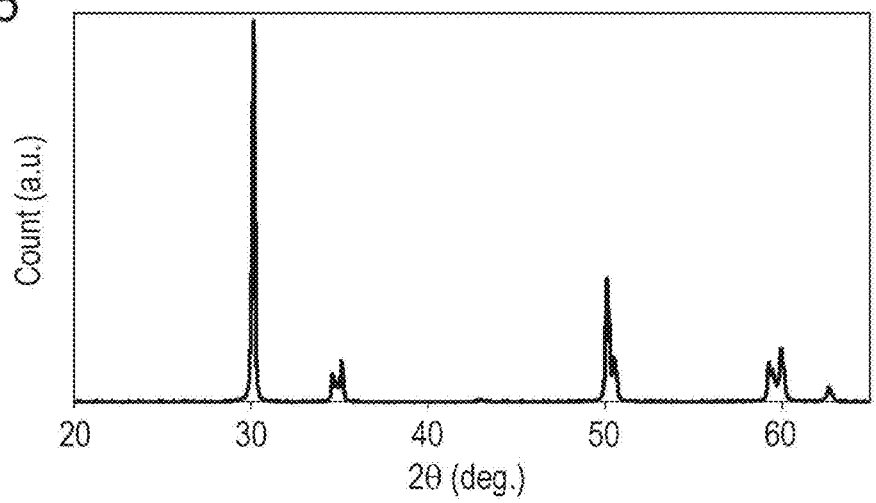
FIG. 5 a powder X-ray diffraction pattern of the zirconia sintered body of Example 9.

FIG. 5 shows an XRD pattern of the zirconia sintered body of this example. The XRD pattern showed that the crystal structure of the zirconia sintered body of this example was a mixed phase of a cubic phase and a tetragonal phase.

Figure 4:
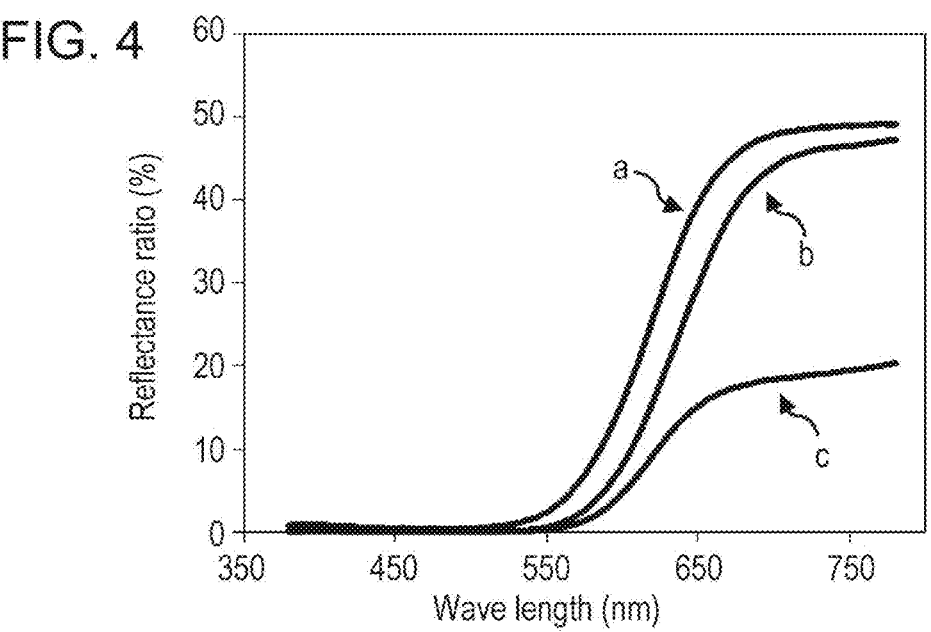
FIG. 4 reflectance ratios of zirconia sintered bodies (a: Example 7, b: Example 9, c: Comparative Example 3).

Furthermore, FIG. 4($b$) shows the reflectance ratio of the zirconia sintered body of this example. The reflectance ratio at a wavelength of 650 nm was 29.8%, and the reflectance ratio at a wavelength of 700 nm was 44.0%, showing that the zirconia sintered body of this example had a high reflectance ratio. The reflectance ratio at a wavelength of 550 nm was 0.71%, and a strong light absorption due to trivalent cerium was confirmed.

Example 10

A primary sintered body was obtained in the same manner as in Example 1 except that a mixed powder was prepared by using 49.25 g of a 2 mol % yttria-containing zirconia powder (available from Tosoh Corporation, TZ-2Y; specific surface area 16 m$^2$/g, purity 99.8% or more), 0.5 g of the cerium oxide powder, and 0.25 g of the aluminum oxide powder, primary sintering was conducted at a temperature-increasing rate of 50° C./h in air at a sintering temperature of 1,400° C. for two hours, and the temperature-decreasing rate was 100° C./h.

The resulting primary sintered body was subjected to HIP at a temperature of 1,350° C. and a pressure of 150 MPa for a holding time of one hour. Thus, a zirconia sintered body of this example was obtained. The evaluation results of the primary sintered body are shown in Table 1, and the evaluation results of the zirconia sintered body are shown in Tables 2 and 3. The red sintered body of this example had a molar ratio of trivalent cerium of 91%.

Example 11

A primary sintered body was obtained in the same manner as in Example 10 except that primary sintering was conducted at a temperature-increasing rate of 200° C./h in air at a sintering temperature of 1,500° C. for two hours, and the temperature-decreasing rate was 200° C./h.

The resulting primary sintered body was subjected to HIP at a temperature of 1,450° C. and a pressure of 150 MPa for a holding time of one hour. Thus, a zirconia sintered body of this example was obtained. The evaluation results of the primary sintered body are shown in Table 1, and the evaluation results of the zirconia sintered body are shown in Tables 2 and 3. The red sintered body of this example had a molar ratio of trivalent cerium of 99%.

Example 12

A zirconia sintered body was obtained in the same manner as in Example 10 except that a mixed powder was prepared by using 49.25 g of a 4 mol % yttria-containing zirconia powder (available from Tosoh Corporation, TZ-4 YS; specific surface area 8 m$^2$/g, purity 99.8% or more), 0.5 g of the cerium oxide powder, and 0.25 g of the aluminum oxide powder. The evaluation results of the primary sintered body are shown in Table 1, and the evaluation results of the zirconia sintered body are shown in Tables 2 and 3. The red sintered body of this example had a molar ratio of trivalent cerium of 100%.

Example 13

A primary sintered body was obtained in the same manner as in Example 12 except that primary sintering was conducted at a temperature-increasing rate of 200° C./h in air at a sintering temperature of 1,500° C. for two hours, and the temperature-decreasing rate was 200° C./h.

The resulting primary sintered body was subjected to HIP at a temperature of 1,450° C. and a pressure of 150 MPa for a holding time of one hour. Thus, a zirconia sintered body of this example was obtained. The evaluation results of the primary sintered body are shown in Table 1, and the evaluation results of the zirconia sintered body are shown in Tables 2 and 3. The red sintered body of this example had a molar ratio of trivalent cerium of 100%.

TABLE 1

| | Composition | | | Measured density (g/cm$^3$) | Relative density (%) |
|---|---|---|---|---|---|
| | $Y_2O_3$ (mol %) | $CeO_2$ (mol %) | $Al_2O_3$ (wt %) | | |
| Example 1 | 3 | 0.7 | 0.25 | 6.08 | 99.82 |
| Example 2 | 3 | 0.7 | 0.25 | 6.09 | 99.98 |
| Example 3 | 3 | 0.7 | 0.25 | 6.08 | 99.82 |
| Example 4 | 3 | 0.7 | 0.6 | 6.08 | 100.00 |
| Example 5 | 3 | 0.7 | 0.6 | 6.06 | 99.68 |
| Example 6 | 3 | 0.7 | 0.6 | 6.08 | 100.00 |
| Example 7 | 3 | 0.7 | 1.0 | 6.06 | 99.89 |
| Example 8 | 3 | 1.5 | 1.0 | 6.06 | 99.74 |
| Example 9 | 3 | 2.2 | 1.0 | 6.07 | 99.75 |
| Example 10 | 2 | 0.7 | 0.5 | 6.08 | 99.48 |
| Example 11 | 2 | 0.7 | 0.5 | 6.07 | 99.32 |
| Example 12 | 4 | 0.7 | 0.5 | 6.05 | 99.47 |
| Example 13 | 4 | 0.7 | 0.5 | 6.05 | 99.47 |

The composition of each of the primary sintered bodies was the same as the composition of the raw material powder, and each of the primary sintered bodies had a relative density of 99% or more. Furthermore, each of the primary sintered bodies exhibited a yellow color. This color tone is based on the absorption of tetravalent cerium.

TABLE 2

|  | Composition | | | Measured density (G/cm³) | Average crystal grain size (μm) | Biaxial flexural strength (MPa) | Reflectance ratio (%) |
|---|---|---|---|---|---|---|---|
|  | $Y_2O_3$ (mol %) | $CeO_2$ (mol %) | $Al_2O_3$ (wt %) | | | | |
| Example 1 | 3 | 0.7 | 0.25 | 6.08 | 0.90 | 720 | 41.1 |
| Example 2 | 3 | 0.7 | 0.25 | 6.09 | — | — | 41.4 |
| Example 3 | 3 | 0.7 | 0.25 | 6.08 | — | — | 38.4 |
| Example 4 | 3 | 0.7 | 0.6 | 6.08 | 0.86 | 890 | 45.8 |
| Example 5 | 3 | 0.7 | 0.6 | 6.07 | — | — | 46.8 |
| Example 6 | 3 | 0.7 | 0.6 | 6.08 | — | — | 43.3 |
| Example 7 | 3 | 0.7 | 1.0 | 6.06 | 0.79 | 890 | 48.4 |
| Example 8 | 3 | 1.5 | 1.0 | 6.06 | 0.80 | 960 | 47.3 |
| Example 9 | 3 | 2.2 | 1.0 | 6.07 | 0.86 | 1030 | 45.6 |
| Example 10 | 2 | 0.7 | 0.5 | 6.09 | 0.65 | 2000 | 30.7 |
| Example 11 | 2 | 0.7 | 0.5 | 6.08 | — | 1640 | 36.2 |
| Example 12 | 4 | 0.7 | 0.5 | 6.06 | 0.69 | 2120 | 30.0 |
| Example 13 | 4 | 0.7 | 0.5 | 6.04 | — | 1670 | 26.5 |

*In the table, symbol "-" represents "unmeasured".

TABLE 3

|  | Color tone of sample having thickness of 1.0 mm | | | | Color tone of sample having thickness of 0.5 mm | | | | $\Delta E^*ab$ |
|---|---|---|---|---|---|---|---|---|---|
|  | L* | a* | b* | a*/b* | L* | a* | b* | a*/b* | |
| Example 1 | 24.9 | 43.1 | 39.7 | 1.09 | 25.6 | 44.4 | 41.4 | 1.07 | 2.3 |
| Example 2 | 26.2 | 42.6 | 39.7 | 1.07 | 27.2 | 43.9 | 42.2 | 1.04 | 2.9 |
| Example 3 | 24.5 | 42.1 | 39.6 | 1.06 | 25.6 | 43.8 | 41.5 | 1.06 | 2.8 |
| Example 4 | 28.4 | 43.8 | 44.7 | 0.98 | 28.7 | 44.2 | 45.6 | 0.97 | 1.1 |
| Example 5 | 30.1 | 43.7 | 46.9 | 0.93 | 32.4 | 43.8 | 48.1 | 0.91 | 2.6 |
| Example 6 | 28.5 | 43.0 | 45.0 | 0.96 | 29.3 | 44.7 | 47.2 | 0.95 | 2.9 |
| Example 7 | 31.3 | 43.4 | 46.5 | 0.93 | 32.8 | 44.4 | 47.6 | 0.93 | 2.1 |
| Example 8 | 25.4 | 42.7 | 40.4 | 1.06 | 25.8 | 43.7 | 41.6 | 1.05 | 1.6 |
| Example 9 | 22.6 | 41.6 | 36.0 | 1.16 | 22.3 | 40.3 | 35.7 | 1.14 | 1.1 |
| Example 10 | 26.8 | 38.6 | 41.5 | 0.93 | 27.2 | 40.4 | 43.5 | 0.93 | 2.7 |
| Example 11 | 26.1 | 41.5 | 42.1 | 0.99 | 25.4 | 40.3 | 41.3 | 0.98 | 1.6 |
| Example 12 | 25.7 | 38.7 | 41.4 | 0.93 | 24.8 | 37.1 | 39.9 | 0.93 | 2.7 |
| Example 13 | 23.3 | 39.2 | 37.9 | 1.04 | 21.6 | 36.1 | 36.1 | 1.00 | 2.8 |

The resulting zirconia sintered bodies each exhibited a bright red color. These results showed that each of the zirconia sintered bodies contained trivalent cerium. Furthermore, even when the sintered body was formed into a sintered body having a different sample thickness, no change in color tone was visually observed, and the color difference $\Delta E^*ab$ was 3 or less. The crystal structure of each of the zirconia sintered bodies mainly included a tetragonal phase and was a mixed phase of a tetragonal phase and a cubic phase. A reduction ratio of ceria (the amount of trivalent cerium in the total cerium) calculated from the decrease in the weight before and after the HIP was 80% to 100%.

Example 14

(Preparation of Raw Material Powder)

A raw material powder was prepared. In the same manner as in Example 1 except that a plate-like alumina powder having an average particle size of 2 μm and an average thickness of 0.1 μm was used as an aluminum oxide powder, and a mixed powder was prepared by using 49.0 g of the 3 mol % yttria-containing zirconia powder, 0.5 g of the cerium oxide powder, and 0.5 g of the aluminum oxide powder.

A primary sintered body and a zirconia sintered body were prepared in the same manner as in Example 1 except that the raw material powder prepared above was used. The resulting primary sintered body had a light-yellow color tone.

The evaluation results of the primary sintered body are shown in Table 4, and the evaluation results of the zirconia sintered body are shown in Tables 5 and 6.

The red sintered body of this example had a molar ratio of trivalent cerium of 88%.

Figure 6:
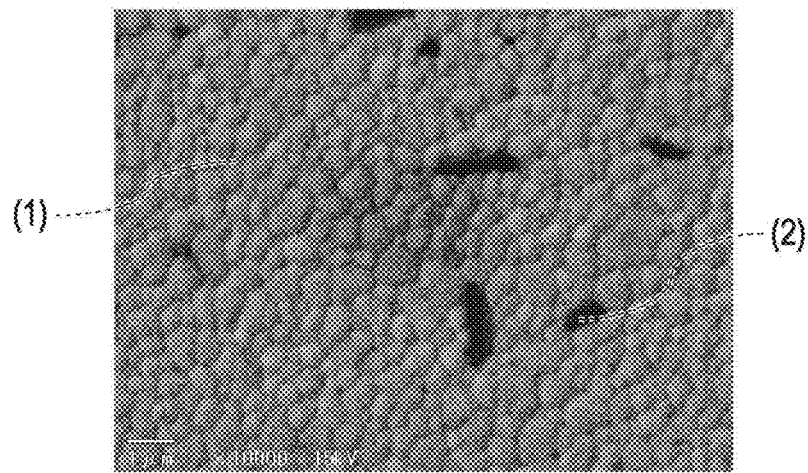
FIG. 6 a scanning electron microscopy image of the zirconia sintered body of Example 14 (the scale in the figure represents 1 μm).

FIG. 6 shows an SEM observation image of the zirconia sintered body of this example. In the microstructure of the zirconia sintered body of this example, crystal grains of alumina each had a crystal grain size of 2 μm or less and had a plate-like shape. In addition, it was confirmed that grain boundaries due to crystal grains of alumina were not formed. Furthermore, it was confirmed that zirconia had an average crystal grain size of 0.79 μm.

Example 15

A raw material powder, a primary sintered body, and a zirconia sintered body were obtained in the same manner as in Example 14 except that a plate-like alumina powder having an average particle size of 2 μm and an average thickness of 0.06 μm was used as an aluminum oxide powder.

The evaluation results of the primary sintered body are shown in Table 4, and the evaluation results of the zirconia sintered body are shown in Tables 5 and 6. The red sintered body of this example had a molar ratio of trivalent cerium of 100%. In SEM observation of the resulting zirconia sintered body, it was confirmed that alumina having a plate-like shape was uniformly dispersed while maintaining the shape of the raw material.

Example 16

A raw material powder, a primary sintered body and a zirconia sintered body were obtained in the same manner as in Example 14 except that a plate-like alumina powder having an average particle size of 5 μm and an average thickness of 0.25 μm was used as an aluminum oxide powder. The evaluation results of the primary sintered body are shown in Table 4, and the evaluation results of the zirconia sintered body are shown in Tables 5 and 6. The red sintered body of this example had a molar ratio of trivalent cerium of 95%.

TABLE 4

| | Composition | | | Measured density ($g/cm^3$) | Relative density (%) |
|---|---|---|---|---|---|
| | $Y_2O_3$ (mol %) | $CeO_2$ (mol %) | $Al_2O_3$ (wt %) | | |
| Example 14 | 3 | 0.7 | 1.0 | 6.04 | 99.38 |
| Example 15 | 3 | 0.7 | 1.0 | 6.02 | 99.08 |
| Example 16 | 3 | 0.7 | 1.0 | 6.06 | 99.74 |

TABLE 5

| | Composition | | | Measured density ($g/cm^3$) | Average crystal grain size (μm) | Biaxial flexural strength (MPa) | Reflectance ratio (%) |
|---|---|---|---|---|---|---|---|
| | $Y_2O_3$ (mol %) | $CeO_2$ (mol %) | $Al_2O_3$ (wt %) | | | | |
| Example 14 | 3 | 0.7 | 1.0 | 6.07 | 0.86 | 1070 | 44.2 |
| Example 15 | 3 | 0.7 | 1.0 | 6.07 | 0.85 | 1250 | 41.1 |
| Example 16 | 3 | 0.7 | 1.0 | 6.07 | 0.87 | 810 | 45.4 |

TABLE 6

| | Color tone of sample having thickness of 1.0 mm | | | | Color tone of sample having thickness of 0.5 mm | | | | |
|---|---|---|---|---|---|---|---|---|---|
| | L* | a* | b* | a*/b* | L* | a* | b* | a*/b* | ΔE*ab |
| Example 14 | 29.8 | 43.1 | 46.1 | 0.94 | 29.7 | 43.0 | 46.5 | 0.93 | 0.4 |
| Example 15 | 31.1 | 43.9 | 48.2 | 0.91 | 30.8 | 43.4 | 48.0 | 0.90 | 0.7 |
| Example 16 | 29.2 | 43.3 | 45.0 | 0.96 | 30.0 | 44.5 | 46.8 | 0.95 | 2.4 |

Each of the resulting zirconia sintered bodies exhibited a bright red color. Furthermore, even when the sintered body was formed into a sintered body having different sample thickness, no change in color tone was visually observed, and the color difference ΔE*ab was 2.5 or less. Furthermore, the crystal phase of each of the zirconia sintered bodies was a mixed phase of a cubic phase and a tetragonal phase.

Comparative Example 1

A primary sintered body and a zirconia sintered body of this comparative example were obtained in the same manner as in Example 1 except that a mixed powder was prepared using 49.3 g of the 3 mol % yttria-containing zirconia powder, 0.25 g of the cerium oxide powder, and 0.5 g of the aluminum oxide powder. The evaluation results of the primary sintered body are shown in Table 7, and the evaluation results of the zirconia sintered body are shown in Tables 8 and 9.

Comparative Example 2

A raw material powder, a primary sintered body, and a zirconia sintered body were obtained in the same manner as in Comparative Example 1 except that a mixed powder was prepared by using 48.5 g of the 3 mol % yttria-containing zirconia powder, 0.5 g of the cerium oxide powder, and 1.0 g of the aluminum oxide powder. The evaluation results of the primary sintered body are shown in Table 7, and the evaluation results of the zirconia sintered body are shown in Tables 8 and 9.

Comparative Example 3

A zirconia sintered body was obtained in the same manner as in No. 24 of Example 2 in PTL 1. Specifically, a raw material powder, a primary sintered body, and a zirconia sintered body were obtained in the same manner as in Comparative Example 1 except that a mixed powder was prepared by using 91.6 g of a zirconia powder (available from. Tosoh Corporation, TZ-0Y; specific surface area 13 $m^2/g$, purity 99.8% or more), 1.35 g of the cerium oxide powder, and 7.1 g of an yttrium oxide powder (purity 99.9% or more), the primary sintering temperature was 1,450° C., and HIP was conducted at a temperature of 1,475° C. and a pressure of 150 MPa for a holding time of one hour.

The evaluation results of the primary sintered body are shown in Table 7, the evaluation results of the zirconia sintered body are shown in Tables 8 and 9, and the reflectance ratio is shown in FIG. 4(c). The zirconia sintered body of this comparative example was dark brown to black. The reflectance ratio at a wavelength of 650 nm was 15.3%, and the reflectance ratio at a wavelength of 700 nm was 18.5%.

Comparative Example 4

A zirconia sintered body was obtained in the same manner as in No. 5 of Example 1 in PTL 1. Specifically, a raw material powder and a zirconia sintered body were obtained in the same manner as in Comparative Example 3 except that firing was conducted at a firing temperature of 1,500° C. in an Ar stream at atmospheric pressure while a sample was placed in a carbon container, and HIP was not conducted. The zirconia sintered body of this comparative example was brown with a yellow tinge. The reflectance ratio at a wavelength of 650 nm was 50.0%, and the reflectance ratio at a wavelength of 700 nm was 50.4%. Since the reflectance ratio was high at a wavelength of 550 nm or more, a brown color tone with a yellow tinge was exhibited. The evaluation results of a primary sintered body are shown in Table 7, and the evaluation results of the zirconia sintered body are shown in Tables 8 and 9.

Comparative Example 5

A primary sintered body and a zirconia sintered body of this comparative example were obtained in the same manner as in Example 1 except that a mixed powder was prepared by using 46.8 g of the 3 mol % yttria-containing zirconia powder, 2.75 g of the cerium oxide powder, and 0.5 g of the aluminum oxide powder. The evaluation results of the primary sintered body are shown in Table 7, and the evaluation results of the zirconia sintered body are shown in Tables 8 and 9. The zirconia sintered body of Comparative Example 5 exhibited, in a central portion thereof, a black color that could be visually observed.

TABLE 7

| | Composition | | | Measured | Relative |
|---|---|---|---|---|---|
| | $Y_2O_3$ (mol %) | $CeO_2$ (mol %) | $Al_2O_3$ (wt %) | density (g/cm$^3$) | density (%) |
| Comparative Example 1 | 3 | 0.35 | 1 | 6.05 | 99.72 |
| Comparative Example 2 | 3 | 0.7 | 2 | 6.03 | 99.77 |
| Comparative Example 3 | 4 | 1.0 | 0 | 6.06 | 99.47 |
| Comparative Example 4 | 4 | 1.0 | 0 | 6.01 | 98.65 |
| Comparative Example 5 | 3 | 4.1 | 1 | 6.05 | 99.05 |

TABLE 8

| | Composition | | | Measured | Average crystal grain | Biaxial flexural | Reflectance |
|---|---|---|---|---|---|---|---|
| | $Y_2O_3$ (mol %) | $CeO_2$ (mol %) | $Al_2O_3$ (wt %) | density (g/cm$^3$) | size (μm) | strength (MPa) | ratio (%) |
| Comparative Example 1 | 3 | 0.35 | 1 | 6.06 | 0.82 | 1290 | 46.5 |
| Comparative Example 2 | 3 | 0.7 | 2 | 6.03 | 0.92 | 880 | 56.2 |
| Comparative Example 3 | 4 | 1.0 | 0 | 6.08 | 0.76 | 1000 | 18.9 |
| Comparative Example 4 | 4 | 1.0 | 0 | 6.01 | 0.65 | 680 | 50.9 |
| Comparative Example 5 | 3 | 4.1 | 1 | 6.05 | 0.95 | 1050 | 19.8 |

TABLE 9

| | Color tone of sample having thickness of 1.0 mm | | | | Color tone of sample having thickness of 0.5 mm | | | | |
|---|---|---|---|---|---|---|---|---|---|
| | L* | a* | b* | a*/b* | L* | a* | b* | a*/b* | ΔE*ab |
| Comparative Example 1 | 37.0 | 41.9 | 52.3 | 0.80 | 35.1 | 43.0 | 53.5 | 0.82 | 2.5 |
| Comparative Example 2 | 39.7 | 41.5 | 52.9 | 0.78 | 38.6 | 40.1 | 51.5 | 0.78 | 2.3 |
| Comparative Example 3 | 15.6 | 34.5 | 25.2 | 1.37 | 18.5 | 38.7 | 30.4 | 1.27 | 7.3 |
| Comparative Example 4 | 52.4 | 32.3 | 48.3 | 0.67 | 37.6 | 28.3 | 44.0 | 0.64 | 15.9 |
| Comparative Example 5 | 16.9 | 32.3 | 26.8 | 1.21 | 19.3 | 40.8 | 32.3 | 1.26 | 10.4 |

The sintered bodies obtained in Comparative Examples 1 and 2 had orange color tones, which were different from red color tones. In each of Comparative Examples 3 and 4, a brown color tone was exhibited, and it was confirmed that the color tone significantly changed depending on the thickness of the sintered body.

Comparative Example 6

A raw material powder, a primary sintered body, and a zirconia sintered body were obtained in the same manner as in Example 7 except that a silica powder was used instead of the aluminum oxide powder. The evaluation results of the resulting primary sintered body are shown in Table 10, and the evaluation results of the zirconia sintered body are shown in Tables 11 and 12.

Comparative Example 7

A raw material powder, a primary sintered body, and a zirconia sintered body were obtained in the same manner as in Example 7 except that a titania powder was used instead of the aluminum oxide powder. The evaluation results of the resulting primary sintered body are shown. In Table 10, and the evaluation results of the zirconia sintered body are shown in Tables 11 and 12.

TABLE 10

|  | Composition | | | | Measured density ($g/cm^3$) | Relative density (%) |
| --- | --- | --- | --- | --- | --- | --- |
|  | $Y_2O_3$ (mol %) | $CeO_2$ (mol %) | $SiO_2$ (wt %) | $TiO_2$ (wt %) | | |
| Comparative Example 6 | 3 | 0.7 | 1 | 0 | 5.99 | 98.98 |
| Comparative Example 7 | 3 | 0.7 | 0 | 1 | 6.04 | 99.37 |

TABLE 11

|  | Composition | | | | Measured density ($g/cm^3$) | Average crystal grain size (μm) | Biaxial flexural strength (MPa) | Reflectance ratio (%) |
| --- | --- | --- | --- | --- | --- | --- | --- | --- |
|  | $Y_2O_3$ (mol %) | $CeO_2$ (mol %) | $SiO_2$ (wt %) | $TiO_2$ (wt %) | | | | |
| Comparative Example 6 | 3 | 0.7 | 1 | 0 | 6.01 | 0.93 | 680 | 63.7 |
| Comparative Example 7 | 3 | 0.7 | 0 | 1 | 6.07 | 0.85 | 1210 | 1.1 |

TABLE 12

|  | Color tone of sample having thickness of 1.0 mm | | | | Color tone of sample having thickness of 0.5 mm | | | | $\Delta E^*ab$ |
| --- | --- | --- | --- | --- | --- | --- | --- | --- | --- |
|  | $L^*$ | $a^*$ | $b^*$ | $a^*/b^*$ | $L^*$ | $a^*$ | $b^*$ | $a^*/b^*$ | |
| Comparative Example 6 | 44.2 | 41.0 | 48.9 | 0.84 | 43.0 | 38.6 | 49.9 | 0.77 | 3.2 |
| Comparative Example 7 | 2.3 | 4.9 | 3.2 | 1.52 | 2.8 | 6.4 | 4.7 | 1.37 | 2.2 |

The zirconia sintered body of Comparative Example 6 exhibited an orange color in which white spots that could be visually observed were present in a scattered manner. The zirconia sintered body of Comparative Example 7 exhibited a black color.

Example 17

A complex sintered body including a red zirconia sintered body and a black zirconia sintered body, and a member formed of the complex sintered body were prepared by the method described below.

(Red Zirconia Raw Material Powder)

49.4 g of a 3 mol % yttria-containing zirconia powder (available from Tosoh Corporation, TZ-3YS; specific surface area 7 $m^2/g$), 0.5 g of a cerium oxide powder having an average particle size of 0.8 μm, 0.13 g of a substantially spherical aluminum oxide powder having an average particle size of 0.3 μm, and ethanol were mixed to prepare a slurry. The resulting slurry was mixed and ground for 24 hours in a ball mill using zirconia balls each having a diameter of 10 mm to prepare a mixed powder. The mixed powder was dried in air at 110° C. and then sieved to obtain a powder having a particle size of 500 μm or less. This powder was used as a red zirconia raw material powder.

(Black Zirconia Raw Material Powder)

A powder having a particle size of 500 μm or less was prepared in the same manner as in the red zirconia raw material powder except that 48.4 g of the 3 mol % yttria-containing zirconia powder (available from. Tosoh. Corporation, TZ-3YS), 1.5 g of a high-purity titanium oxide (available from Showa Denko K.K.), 0.13 g of the substantially spherical aluminum oxide powder having an average particle size of 0.3 μm (purity 99.9% or more), and ethanol were mixed to prepare a slurry. This powder was used as a black zirconia raw material powder.

(Preparation of Green Body)

The black zirconia raw material powder was subjected to uniaxial press molding at room temperature. The uniaxial press molding was performed by pressing with a columnar die having a diameter of about 20 mm and, on one side thereof, a convex portion having a cross shape with dimensions of 15 mm in a longitudinal direction and 15 mm in a transverse direction and a width of 3 mm. Thus, a disk-shaped primary compact having a diameter of 20 mm and a cross-shaped concave pattern on one surface thereof was obtained. A space on the resulting primary green body was filled with the red zirconia raw material powder, and the primary green body and the red zirconia raw material powder were subjected to uniaxial press molding at the same time. The resulting green body after uniaxial pressing was subjected to cold isostatic pressing (CIP) to obtain a secondary green body. The CIP was conducted at a pressure of 200 MPa, and the molding temperature in the CIP was room temperature or lower.

(Firing and HIP)

The secondary green body was fired in air at a temperature-increasing rate of 100° C./h and a firing temperature of 1,450° C. for a sintering time of two hours to obtain a primary sintered body.

The resulting primary sintered body was placed in a carbon container and was then subjected to HIP in an atmosphere of argon gas having a purity of 99.9% at a HIP temperature of 1,350° C. and a HIP pressure of 150 MPa for a holding time of one hour, thereby obtaining a HIP-treated product. The HIP-treated product was used as a complex sintered body of this example. The composition and the color tone of the resulting red zirconia sintered body in the complex sintered body of this example are shown in Table 13, and the composition and the color tone of the resulting black zirconia sintered body are shown in Table 14.

(Processing into Member)

The complex sintered body of this example was ground and polished from the black zirconia sintered body side until a cross pattern formed of the red zirconia sintered body could be confirmed on the surface. Subsequently, the complex sintered body was ground and polished from the red zirconia sintered body side to adjust the thickness of the complex sintered body, thus obtaining a member formed of a complex sintered body with a diameter of 16 mm and a thickness of 2 mm, the complex sintered body having a cross pattern with dimensions of 12 mm in a longitudinal direction and 12 mm in a transverse direction and a width of 3 mm. There was no gap at the interface between the red zirconia sintered body and the black zirconia sintered body in the complex sintered body, and no color bleeding was visually observed at the interface.

Example 18

A complex sintered body including a black zirconia sintered body and a red zirconia sintered body was obtained in the same manner as in Example 17 except that the HIP temperature was 1,400° C. The composition and the color tone of the red zirconia sintered body in the complex sintered body of this example are shown in Table 13, and the composition and the color tone of the black zirconia sintered body are shown in Table 14.

Figure 7:
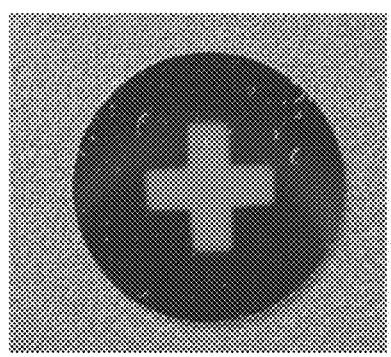
FIG. 7 a photograph of an outer appearance of the zirconia complex sintered body of Example 18.

The complex sintered body of this example was processed into a member in the same manner as in Example 17, thus obtaining a member formed of a complex sintered body with a diameter of 16 mm and a thickness of 2 mm, the complex sintered body having a cross pattern with dimensions of 12 mm in a longitudinal direction and 12 mm in a transverse direction and a width of 3 mm. FIG. 7 shows an outer appearance of the resulting member. The member had a surface formed of the black zirconia sintered body and, on the surface, a cross pattern formed of the red zirconia sintered body. There was no gap at the interface between the two materials, and no color bleeding was visually observed at the interface.

A point analysis was conducted. In the vicinity of the interface of the red sintered body by using an EPMA. According to the results, titanium, which is an element that was contained in the black zirconia sintered body, was not observed in a region of the red sintered body at a distance of 100 µm or more from the interface, showing that a migration region was within 100 µm.

In the complex sintered body of this example, the black zirconia sintered body had an average crystal grain size of 0.84 µm, and the red zirconia sintered body had an average crystal grain size of 0.9 µm.

Figure 8:
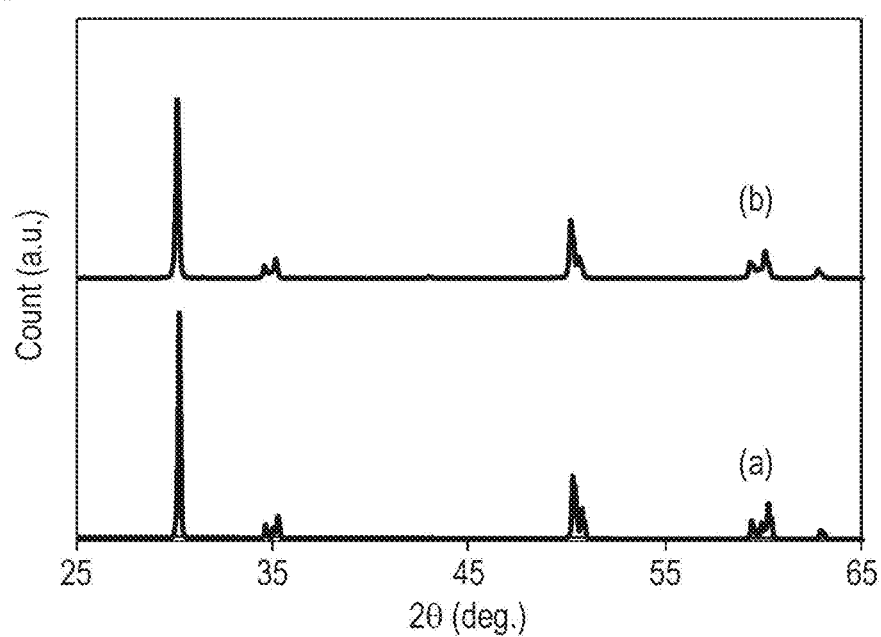
FIG. 8 powder X-ray diffraction patterns of zirconia sintered bodies the black zirconia sintered body of Example 18, b: the fluorescent blue-green zirconia sintered body of Example 25)

The black zirconia sintered body in the complex sintered body of this example was formed of a zirconia sintered body that included a tetragonal phase and a cubic phase and did not include a monoclinic phase. FIG. 8(a) shows the results of XRD measurement of the black zirconia sintered body.

The biaxial flexural strength was measured by using the above member as a measurement sample. The member had a biaxial flexural strength of 1,200 MPa. This member had substantially the same strength as the sintered bodies of the present invention shown in Table 5, and thus it was confirmed that breakage starting from the interface did not occur.

Example 19

A complex sintered body including a black zirconia sintered body and a red zirconia sintered body was obtained in the same manner as in Example 17 except that the HIP temperature was 1,450° C. The composition and the color tone of the red zirconia sintered body in the complex sintered body of this example are shown in Table 13, and the composition and the color tone of the black zirconia sintered body are shown in Table 14.

The complex sintered body of this example was processed into a member in the same manner as in Example 17, thus obtaining a member formed of a complex sintered body with a diameter of 16 mm and a thickness of 2 mm, the complex sintered body having a cross pattern with dimensions of 12 mm in a longitudinal direction and 12 mm in a transverse direction and a width of 3 mm.

Example 20

A black zirconia raw material powder was prepared in the same manner as in Example 17 except that 48.4 g of a 2 mol % yttria-containing zirconia powder (available from Tosoh Corporation, TZ-2Y, specific surface area 12 m$^2$/g, purity 99.8% or more), 1.5 g of the high-purity titanium oxide (available from Showa Denko K.K., specific surface area 19 m$^2$/g, purity 99.0% or more), 0.13 g of the substantially spherical aluminum oxide powder having an average particle size of 0.3 µm (purity 99.9% or more), and ethanol were mixed to prepare a slurry.

A complex sintered body including a black zirconia sintered body and a red zirconia sintered body was obtained in the same manner as in Example 17 except that the black zirconia raw material powder prepared above was used, the primary sintering temperature was 1.400° C. and the HIP temperature was 1,400° C. The composition and the color tone of the red zirconia sintered body in the complex sintered body of this example are shown in Table 13, and the composition and the color tone of the black zirconia sintered body are shown in Table 14.

The complex sintered body of this example was processed into a member in the same manner as in Example 17, thus obtaining a member formed of a complex sintered body with a diameter of 16 mm and a thickness of 2 mm, the complex sintered body having a cross pattern with dimensions of 12 mm in a longitudinal direction and 12 mm in a transverse direction and a width of 3 mm.

Example 21

(Red Zirconia Raw Material Powder)
A red zirconia raw material powder was prepared in the same manner as in Example 17 except that 49.0 g of the 3 mol % yttria-containing zirconia powder (available from Tosoh Corporation, TZ-3YS), 0.5 g of the cerium oxide powder having an average particle size of 0.8 µm (purity 99.9%), 0.5 g of the substantially spherical aluminum oxide powder having an average particle size of 0.3 µm (purity 99.9% or more), and ethanol were mixed to prepare a slurry.
(Black Zirconia Raw Material Powder)
A black zirconia raw material powder was prepared in the same manner as in Example 17 except that 49.4 g of the 3 mol % yttria-containing zirconia powder (available from. Tosoh Corporation, TS-3YS), 0.5 g of the high-purity titanium oxide (available from Showa Denko K.K.), and 0.13 g of the substantially spherical aluminum oxide powder having an average particle size of 0.3 µm (purity 99.9% or more) were weighed.

A complex sintered body including a black zirconia sintered body and a red zirconia sintered body was obtained in the same manner as Example 17 except that the raw material powders prepared above were used, the primary sintering temperature was 1,400° C., and the HIP temperature was 1,400° C. The composition and the color tone of the red zirconia sintered body in the complex sintered body of this example are shown in Table 13, and the composition and the color tone of the black zirconia sintered body are shown in Table 14.

The complex sintered body of this example was processed into a member is the same manner as in Example 17, thus obtaining a member formed of a complex sintered body with a diameter of 16 mm and a thickness of 2 mm, the complex sintered body having a cross pattern with dimensions of 12 mm in a longitudinal direction and 12 mm in a transverse direction and a width of 3 mm.

TABLE 13

Red zirconia sintered body in complex sintered body

| | Composition | | | Color tone | | | |
|---|---|---|---|---|---|---|---|
| | $Y_2O_3$ | $CeO_2$ | $Al_2O_3$ | | | | |
| | (mol %) | (mol %) | (wt %) | L* | a* | b* | a*/b* |
| Example 17 | 3 | 0.7 | 0.25 | 23.8 | 39.9 | 38.9 | 1.03 |
| Example 18 | 3 | 0.7 | 0.25 | 23.5 | 40.0 | 38.8 | 1.03 |
| Example 19 | 3 | 0.7 | 0.25 | 22.2 | 39.4 | 36.9 | 1.07 |
| Example 20 | 2 | 0.7 | 0.25 | 23.4 | 39.2 | 38.5 | 1.02 |
| Example 21 | 3 | 0.7 | 1.00 | 31.0 | 43.5 | 46.2 | 0.94 |

TABLE 14

Black zirconia sintered body in complex sintered body

| | Composition | | | Color tone | | |
|---|---|---|---|---|---|---|
| | $Y_2O_3$ | $TiO_2$ | $Al_2O_3$ | | | |
| | (mol %) | (mol %) | (wt %) | L* | a* | b* |
| Example 17 | 3 | 3 | 0.25 | 0.5 | 0.5 | 0.6 |
| Example 18 | 3 | 3 | 0.25 | 0.3 | 0.6 | 0.5 |

TABLE 14-continued

Black zirconia sintered body in complex sintered body

| | Composition | | | Color tone | | |
|---|---|---|---|---|---|---|
| | $Y_2O_3$ | $TiO_2$ | $Al_2O_3$ | | | |
| | (mol %) | (mol %) | (wt %) | L* | a* | b* |
| Example 19 | 3 | 3 | 0.25 | 0.0 | 0.1 | 0.0 |
| Example 20 | 2 | 3 | 0.25 | 0.0 | 0.1 | 0.0 |
| Example 21 | 3 | 1 | 0.25 | 8.8 | 7.4 | 12.8 |

Example 22

A complex sintered body including a red zirconia sintered body and a white zirconia sintered body, and a member formed of the complex sintered body were prepared by the method described below.
(Red Zirconia Raw Material Powder)
A red zirconia raw material powder was prepared in the same manner as in Example 17 except that 49.4 g of a 3 mol % yttria-containing zirconia powder (available from Tosoh Corporation, TZ-3YS), 0.5 g of a cerium oxide powder having an average particle size of 0.8 µm (purity 99.9%), 0.13 g of a substantially spherical aluminum oxide powder having an average particle size of 0.3 µm (purity 99.9% or more), and ethanol were mixed to prepare a slurry.
(White Zirconia Raw Material Powder)
A 3 mol % yttria-containing zirconia powder containing alumina in an amount of 0.23% by weight (available from Tosoh Corporation, TZ-3YSE; specific surface area 7 m²/g, purity 99.8% or more) was used as a white zirconia raw material powder.
(Preparation of Green Body)
The white zirconia raw material powder was subjected to uniaxial press molding at room temperature. The uniaxial press molding was performed by pressing with a columnar die having a diameter of about 20 mm and, on one side thereof, a convex portion having a triangular shape. Thus, a disk-shaped primary green body having a diameter of 20 mm and a triangular concave on one surface thereof was obtained. A space on the resulting primary green body was filled with the red zirconia powder, and the primary green body and the red zirconia raw material powder were subjected to uniaxial press molding at the same time. The resulting green body after uniaxial pressing was subjected to CIP to obtain a secondary green body. The CIP was conducted at a pressure of 200 MPa, and the molding temperature in the CIP was room temperature or lower.
(Firing and HIP)
Primary firing and HIP were conducted in the same manner as in Example 17 to obtain a complex sintered body including a white zirconia sintered body and a red zirconia sintered body. The composition and the color tone of the red zirconia sintered body in the complex sintered body of this example are shown in Table 15, and the composition and the color tone of the white zirconia sintered body are shown in Table 16.

The red zirconia sintered body in the complex sintered body had a molar ratio of trivalent cerium of 100%.
The complex sintered body of this example was processed into a member in the same manner as in Example 17, thus obtaining a member formed of a complex sintered body with a diameter of 16 mm and a thickness of 2 mm, the complex sintered body having a triangle pattern with a line width of 1 mm. There was no gap at the interface between the two materials, and no color bleeding was visually observed at the interface.

Example 23

(Red Zirconia Raw Material Powder)
A red zirconia raw material powder was prepared in the same manner as in Example 17 except that the red zirconia raw material powder was prepared in the same manner as in Example 17 except that 48.5 g of a 3 mol % yttria-containing zirconia powder (available from Tosoh Corporation, TZ-3YS), 1.0 g of a cerium oxide powder having an average particle size of 0.8 μm (purity 99.9%), 0.5 g or a substantially spherical aluminum oxide powder having an average particle size of 0.3 μm (purity 99.9% or more), and ethanol were mixed to prepare a slurry.
(White Zirconia Raw Material Powder)
A 3 mol % yttria-containing zirconia powder containing alumina in an amount of 20% by weight (available from Tosoh Corporation, TZ-3YS20A; specific surface area 7 m²/g, purity 99.8% or more) was used as a white zirconia raw material powder.
(Preparation of Green Body, Firing, and Processing into Member)
Primary firing and HIP were conducted in the same manner as in Example 22 except that the raw material powders prepared above were used, and the primary firing temperature was 1,500° C., thus obtaining a complex sintered body including a white zirconia sintered body and a red zirconia sintered body. The composition and the color tone of the red zirconia sintered body in the complex sintered body of this example are shown in Table 15, and the composition and the color tone of the white zirconia sintered body are shown in Table 16.
The complex sintered body of this example was processed into a member in the same manner as in Example 22, thus obtaining a member formed of a complex sintered body with a diameter of 16 mm and a thickness of 2 mm, the complex sintered body having a triangle pattern with a line width of mm. There was no gap at the interface between the two materials, and no color bleeding was visually observed at the interface.

TABLE 15

Red zirconia sintered body in complex sintered body

| | Composition | | | Color tone | | | |
|---|---|---|---|---|---|---|---|
| | Y₂O₃ (mol %) | CeO₂ (mol %) | Al₂O₃ (wt %) | L* | a* | b* | a*/b* |
| Example 22 | 3 | 0.7 | 0.25 | 24.7 | 43.0 | 40.2 | 1.07 |
| Example 23 | 3 | 1.4 | 1.00 | 26.1 | 43.1 | 40.9 | 1.05 |

TABLE 16

White zirconia sintered body in complex sintered body

| | Composition | | Color tone | | |
|---|---|---|---|---|---|
| | Y₂O₃ (mol %) | Al₂O₃ (wt %) | L* | a* | b* |
| Example 22 | 3 | 0.25 | 69.5 | -1.1 | -1.0 |
| Example 23 | 3 | 20 | 93.3 | -0.5 | 1.1 |

Example 24

Figure 9:
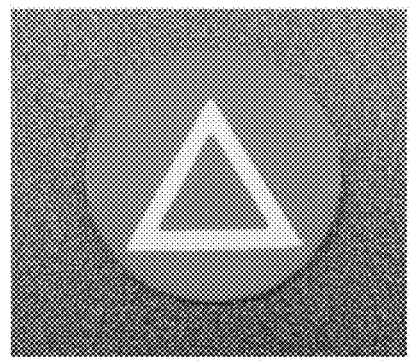
FIG. 9 a photograph of an outer appearance of the zirconia complex sintered body of Example 24.

A complex sintered body including a red zirconia sintered body and a zirconia sintered body that exhibited a fluorescent blue (hereinafter, also referred to as a "fluorescent blue zirconia sintered body"), and a member formed of the complex sintered body were prepared by the method described below.
(Red Zirconia Raw Material Powder)
A red zirconia raw material powder was prepared in the same manner as in Example 17 except that the red zirconia raw material powder was prepared in the same manner as in Example 17 except that 49.4 g of a 3 mol % yttria-containing zirconia powder (available from Tosoh Corporation, TZ-3YS), 0.5 g of a cerium oxide powder having an average particle size of 0.8 μm (purity 99.9% or more), 0.13 g of a substantially spherical aluminum oxide powder having an average particle size of 0.3 μm (purity 99.9% or more), and ethanol were mixed to prepare a slurry.
(Fluorescent Blue Zirconia Raw Material Powder)
A fluorescent blue zirconia raw material powder was prepared in the same manner as in the red zirconia raw material powder except that 47.5 g of the 3 mol % yttria-containing zirconia powder (available from Tosoh Corporation, TZ-3YS), 2.5 g of a europium-containing barium magnesium aluminate (BaMgAl₁₁O₁₉:Eu, hereinafter referred to as "BAM") phosphor powder having an average particle size of 2.9 μm (available from Tokyo Kagaku Kenkyusho Co., Ltd.), and ethanol were mixed to prepare a slurry.
(Preparation of Green Body)
The fluorescent blue zirconia raw material powder was subjected to uniaxial press molding at room temperature. The uniaxial press molding was performed by pressing with a columnar die having a diameter of about 20 mm and, on one side thereof, a convex portion having a triangular shape. Thus, a disk-shaped primary green body having a diameter of mm and a triangular concave pattern on one surface thereof was obtained. A space on the resulting primary green body was filled with the red zirconia powder, and the primary green body and the red zirconia raw material powder were subjected to uniaxial press molding at the same time. The resulting green body after uniaxial pressing was subjected to cold isostatic pressing (CIP) to obtain a secondary green body. The CIP was conducted at a pressure of 200 MPa, and the molding temperature in the CIP was room temperature or lower.
(Firing and HIP)
Primary firing and HIP were conducted in the same manner as in Example 17 to obtain a complex sintered body including a fluorescent blue zirconia sintered body and a red zirconia sintered body. The composition and the color tone of the red zirconia sintered body in the complex sintered body of this example are shown in Table 17, and the composition and the color tone of the fluorescent blue zirconia sintered body are shown in Table 18.
The red zirconia sintered body in the complex sintered body had a molar ratio of trivalent cerium of 98%.
The complex sintered body of this example was processed into a member in the same manner as in Example 17, thus obtaining a member formed of a complex sintered body with a diameter of 16 mm and a thickness of 2 mm, the complex sintered body having a triangle pattern with a line width of 1 mm. There was no gap at the interface between the two materials, and no color bleeding was visually observed at the interface. FIG. 9 shows an outer appearance of the resulting member.

It was confirmed that the fluorescent blue zirconia sintered body emitted blue light having an emission spectrum with a peak wavelength of 450 nm at an excitation wavelength of 365 nm.

Example 25

A complex sintered body including a red zirconia sintered body and a zirconia sintered body that exhibited a fluorescent blue-green (hereinafter, also referred to as a "fluorescent blue-green zirconia sintered body"), and a member formed of the complex sintered body were prepared by the method described below.
(Red Zirconia Raw Material Powder)
A red zirconia raw material powder was prepared in the same manner as in Example 24.
(Fluorescent Blue-Green Zirconia Raw Material Powder)
A fluorescent blue-green zirconia raw material powder was prepared in the same manner as in the red zirconia raw material powder except that 47.5 g of the 3 mol % yttria-containing zirconia powder (available from Tosoh Corporation, TZ-3YS), 2.5 g of a europium-containing strontium aluminate ($Sr_4Al_{14}O_{25}$:Eu, hereinafter referred to as "SAE") phosphor powder having an average particle size of 8.6 μm (available from. Tokyo Kagaku Kenkyusho Co., Ltd.), and ethanol were mixed to prepare a slurry.
(Molding, Firing, and Processing into Member)

A complex sintered body including a fluorescent blue-green zirconia sintered body and a red zirconia sintered body was obtained in the same manner as in Example 24 except that the raw material powders prepared above were used. The composition and the color tone of the red zirconia sintered body in the complex sintered body of this example are shown in Table 17, and the composition and the color tone of the fluorescent blue-green zirconia sintered body are shown in Table 18.

The red zirconia sintered body in the complex sintered body had a molar ratio of trivalent cerium of 95%.

The complex sintered body of this example was processed into a member in the same manner as in Example 17, thus obtaining a member formed of a complex sintered body with a diameter of 16 mm and a thickness of 2 mm, the complex sintered body having a triangle pattern with a line width of 1 mm. There was no gap at the interface between the two materials, and no color bleeding was visually observed at the interface.

According to the results of XRD measurement, each of the resulting red zirconia sintered body and fluorescent blue-green zirconia sintered body had a crystal structure that included a tetragonal phase and a cubic phase and that did not include a monoclinic phase. FIG. 8(b) shows the results of XRD measurement of the fluorescent blue-green zirconia sintered body.

It was confirmed that the fluorescent blue-green zirconia sintered body emitted blue-green light having an emission spectrum with a peak wavelength of 490 nm at an excitation wavelength of 365 nm.

TABLE 17

| | Red zirconia sintered body in complex sintered body | | | | | | |
|---|---|---|---|---|---|---|---|
| | Composition | | | Color tone | | | |
| | $Y_2O_3$ | $CeO_2$ | $Al_2O_3$ | | | | |
| | (mol %) | (mol %) | (wt %) | L* | a* | b* | a*/b* |
| Example 24 | 3 | 0.7 | 0.25 | 24.0 | 42.9 | 41.2 | 1.04 |
| Example 25 | 3 | 0.7 | 0.25 | 23.2 | 43.2 | 40.0 | 1.08 |

TABLE 18

| | Fluorescent blue zirconia sintered body or fluorescent blue-green zirconia sintered body in complex sintered body | | | | | |
|---|---|---|---|---|---|---|
| | Composition | | | Color tone | | |
| | $Y_2O_3$ | BAM | SAE | | | |
| | (mol %) | (wt %) | (wt %) | L* | a* | b* |
| Example 24 | 3 | 5 | 0 | 81.7 | 2.4 | 11.2 |
| Example 25 | 3 | 0 | 5 | 77.6 | −5.8 | 13.4 |

Example 26

(Preparation of Raw Material Powder)
49.4 g of a 3 mol % yttria-containing zirconia powder, 0.5 g of a cerium oxide powder, and 0.13 g of an aluminum oxide powder were weighed. These powders were mixed with water to prepare a slurry. The resulting slurry was mixed and ground for 24 hours in a ball mill using zirconia balls each having a diameter of 10 mm to prepare a mixed powder. The mixed powder was dried in air at 110° C. and then sieved to obtain a powder having a particle size of 180 μm or less. This powder was used as a raw material powder.
(Sintering)

A primary sintered body was obtained in the same manner as in Example 1 except that the raw material powder prepared above was used, and the sintering temperature of primary sintering was 1,550° C. The resulting primary sintered body was fired in a reducing atmosphere at 1,400° C. for a holding time of one hour to obtain a zirconia sintered body. The reducing atmosphere was a hydrogen (5% by volume)-containing argon atmosphere. The zirconia sintered body of this example exhibited a red color and had a molar ratio of trivalent cerium of 100%, an average crystal grain size of 0.92 μm, and a three-point flexural strength of 1,334 MPa. The evaluation results of the primary sintered body are shown in Table 19, and the evaluation results of the zirconia sintered body are shown in Tables 20 and 21.

Example 27

A zirconia sintered body of this example was obtained in the same manner as in Example 26 except that the raw material powder was subjected to die pressing at a pressure of 100 MPa and that cold isostatic pressing was not conducted. The zirconia sintered body of this example exhibited a red color and had a molar ratio of trivalent cerium of 82% and an average crystal grain size of 0.89 μm. The evaluation results of the primary sintered body are shown in Table 19, and the evaluation results of the zirconia sintered body are shown in Tables 20 and 21.

Example 28

A zirconia sintered body was obtained in the same manner as in Example 26 except that the sintering temperature of primary sintering was 1,450° C., and the temperature of reduction pressureless sintering was 1,350° C. The zirconia sintered body of this example exhibited a red color and had a molar ratio of trivalent cerium of 87%. The evaluation results of the primary sintered body are shown in Table 19, and the evaluation results of the zirconia sintered body are shown in Tables 20 and 21.

Example 29

A zirconia sintered body was obtained in the same manner as in Example 28 except that the temperature of reduction pressureless sintering was 1,500° C. The zirconia sintered body of this example exhibited a red color. The red sintered body of this example had a molar ratio of trivalent cerium of 80%. The evaluation results of the primary sintered body are shown in Table 19, and the evaluation results of the zirconia sintered body are shown in Tables 20 and 21.

Example 30

A zirconia sintered body was obtained in the same manner as in Example 28 except that the temperature of primary sintering was 1,600° C. The zirconia sintered body of this example exhibited a red color and had a molar ratio of trivalent cerium of 100%. The evaluation results of the primary sintered body are shown in Table 19, and the evaluation results of the zirconia sintered body are shown in Tables 20 and 21.

Example 31

A zirconia sintered body was obtained in the same manner as in Example 30 except that the temperature of reduction pressureless sintering was 1,500° C. The zirconia sintered body of this example exhibited a red color and had a molar ratio of trivalent cerium of 76%. The evaluation results of the primary sintered body are shown in Table 19, and the evaluation results of the zirconia sintered body are shown in Tables 20 and 21.

Example 32

A primary sintered body was obtained in the same manner as in Example 26 except that the temperature of primary sintering was 1,500° C. The resulting primary sintered body was subjected to HIP at a temperature of 1,400° C. and a pressure of 150 MPa for a holding time of one hour. Thus, a zirconia sintered body of this example was obtained. The zirconia sintered body of this example exhibited a red color and had a molar ratio of trivalent cerium of 89%. The evaluation results of the primary sintered body are shown in Table 19, and the evaluation results of the zirconia sintered body are shown in Tables 20 and 21.

TABLE 19

| | Composition | | | Measured density ($g/cm^3$) | Relative density (%) |
|---|---|---|---|---|---|
| | $Y_2O_3$ (mol %) | $CeO_2$ (mol %) | $Al_2O_3$ (wt %) | | |
| Example 26 | 3 | 0.7 | 0.25 | 6.09 | 100.0 |
| Example 27 | 3 | 0.7 | 0.25 | 6.09 | 99.97 |
| Example 28 | 3 | 0.7 | 0.25 | 6.08 | 99.88 |
| Example 29 | 3 | 0.7 | 0.25 | 6.09 | 99.94 |
| Example 30 | 3 | 0.7 | 0.25 | 6.07 | 99.59 |
| Example 31 | 3 | 0.7 | 0.25 | 6.09 | 100.0 |
| Example 32 | 3 | 0.7 | 0.25 | 6.09 | 100.0 |

TABLE 20

| | Composition | | | Measured density ($g/cm^3$) | Biaxial flexural strength (MPa) | Reflectance ratio (%) |
|---|---|---|---|---|---|---|
| | $Y_2O_3$ (mol %) | $CeO_2$ (mol %) | $Al_2O_3$ (wt %) | | | |
| Example 26 | 3 | 0.7 | 0.25 | 6.09 | 1509 | 35.9 |
| Example 27 | 3 | 0.7 | 0.25 | 6.08 | 1305 | 35.7 |
| Example 28 | 3 | 0.7 | 0.25 | 6.09 | 1373 | 38.4 |
| Example 29 | 3 | 0.7 | 0.25 | 6.09 | — | 32.5 |
| Example 30 | 3 | 0.7 | 0.25 | 6.09 | — | 37.3 |
| Example 31 | 3 | 0.7 | 0.25 | 6.09 | 1411 | 34.7 |
| Example 32 | 3 | 0.7 | 0.25 | 6.08 | — | 36.8 |

*In the table, symbol "—" represents "unmeasured".

TABLE 21

| | Color tone of sample having thickness of 1.0 mm | | | | Color tone of sample having thickness of 0.5 mm | | | | |
|---|---|---|---|---|---|---|---|---|---|
| | L* | a* | b* | a*/b* | L* | a* | b* | a*/b* | ΔE*ab |
| Example 26 | 25.5 | 40.0 | 33.6 | 1.19 | 26.6 | 41.2 | 35.6 | 1.16 | 2.6 |
| Example 27 | 25.9 | 39.2 | 36.1 | 1.25 | 26.6 | 41.3 | 36.4 | 1.13 | 2.2 |
| Example 28 | 28.1 | 40.7 | 39.6 | 1.03 | 28.3 | 40.9 | 40.6 | 1.01 | 1.1 |

TABLE 21-continued

| | Color tone of sample having thickness of 1.0 mm | | | | Color tone of sample having thickness of 0.5 mm | | | | |
|---|---|---|---|---|---|---|---|---|---|
| | L* | a* | b* | a*/b* | L* | a* | b* | a*/b* | ΔE*ab |
| Example 29 | 26.6 | 38.6 | 35.4 | 1.09 | 27.5 | 40.1 | 37.5 | 1.07 | 2.7 |
| Example 30 | 26.8 | 40.1 | 36.2 | 1.11 | 26.9 | 40.1 | 37.0 | 1.08 | 0.8 |
| Example 31 | 26.2 | 38.2 | 32.0 | 1.39 | 27.3 | 39.8 | 33.8 | 1.18 | 2.6 |
| Example 32 | 25.2 | 39.8 | 30.4 | 1.31 | 25.8 | 40.0 | 32.1 | 1.25 | 1.8 |

Comparative Example 8

A raw material powder, a primary sintered body, and a zirconia sintered body were obtained in the same manner as in Example 26 except that a mixed powder was prepared by using 49.5 g of the 3 mol % yttria-containing zirconia powder and 0.5 g of the cerium oxide powder, the primary sintering temperature was 1,400° C., and the temperature of reduction pressureless sintering was 1,500° C. The zirconia sintered body of this comparative example exhibited an orange color.

The evaluation results of the primary sintered body are shown in Table 22, and the evaluation results of the zirconia sintered body are shown in Tables 23 and 24.

Comparative Example 9

A raw material powder, a primary sintered body, and a zirconia sintered body were obtained in the same manner as in Comparative Example 8 except that a mixed powder was prepared by using 47.0 g of the 3 mol % yttria-containing zirconia powder, 0.5 g of the cerium oxide powder, and 2.5 g of an aluminum oxide powder, and the primary sintering temperature was 1,450° C. The evaluation results of the primary sintered body are shown in Table 22, and the evaluation results of the zirconia sintered body are shown in Tables 23 and 24.

Comparative Example 10

A primary sintered body and a zirconia sintered body of this comparative example were obtained in the same manner as in Comparative Example 9 except that a mixed powder was prepared by using 49.3 g of the 3 mol % yttria-containing zirconia powder and 0.25 g of the cerium oxide powder. The evaluation results of the primary sintered body are shown in Table 22, and the evaluation results of the zirconia sintered body are shown in Tables 23 and 24.

Comparative Example 11

A primary sintered body and a zirconia sintered body of this comparative example were obtained in the same manner as in Comparative Example 9 except that a mixed powder was prepared by using 45.0 g of the 3 mol % yttria-containing zirconia powder and 5.0 g of the cerium oxide powder. The evaluation results of the primary sintered body are shown in Table 22, and the evaluation results of the zirconia sintered body are shown in Tables 23 and 24.

The resulting zirconia sintered body had a color tone with a brown tinge. Furthermore, as a result of visually observing the color tone of a sample having a thickness of 1 mm and the color tone of the sample prepared by polishing a surface thereof by 0.5 mm, the difference between the two color tones was recognizable.

Comparative Example 12

A zirconia sintered body was obtained in the same manner as in Example 26 except that a mixed powder was prepared by using 49.475 g of the 3 mol % yttria-containing zirconia powder, 0.5 g of the cerium oxide powder, and 0.025 g of the aluminum oxide powder, the primary sintering temperature was 1,450° C., and the temperature of reduction pressureless sintering was 1,450° C.

The resulting zirconia sintered body exhibited a red color. However, the zirconia sintered body of this comparative example had a $\Delta E^*_{ab}$ of 6.2, which showed a large difference in color tone between a surface of a sintered body and an inside of the sintered body. Although each of the surface and the inside of the sintered body exhibited a reddish color, the surface and the inside exhibited color tones that were clearly different from each other.

TABLE 22

| | Composition | | | Measured | Relative |
|---|---|---|---|---|---|
| | $Y_2O_3$ (mol %) | $CeO_2$ (mol %) | $Al_2O_3$ (wt %) | density (g/cm³) | density (%) |
| Comparative Example 8 | 3 | 0.7 | 0 | 5.70 | 93.52 |
| Comparative Example 9 | 3 | 0.7 | 5 | 6.09 | 100.0 |
| Comparative Example 10 | 3 | 0.35 | 0 | 6.07 | 99.56 |
| Comparative Example 11 | 3 | 7.4 | 0 | 6.16 | 99.62 |
| Comparative Example 12 | 3 | 0.7 | 0.05 | 6.08 | 99.72 |

TABLE 23

| | Composition | | | Measured | Reflectance |
|---|---|---|---|---|---|
| | $Y_2O_3$ (mol %) | $CeO_2$ (mol %) | $Al_2O_3$ (wt %) | density (g/cm³) | ratio (%) |
| Comparative Example 8 | 3 | 0.7 | 0 | 5.99 | 69.8 |
| Comparative Example 9 | 3 | 0.7 | 5 | 6.08 | 62.5 |
| Comparative Example 10 | 3 | 0.35 | 0 | 6.09 | 50.5 |
| Comparative Example 11 | 3 | 7.4 | 0 | 5.95 | 32.7 |
| Comparative Example 12 | 3 | 0.7 | 0.05 | 6.09 | 25.9 |

TABLE 24

|  | Color tone of sample having thickness of 1.0 mm | | | | Color tone of sample having thickness of 0.5 mm | | | | |
| --- | --- | --- | --- | --- | --- | --- | --- | --- | --- |
|  | L* | a* | b* | a*/b* | L* | a* | b* | a*/b* | ΔE*ab |
| Comparative Example 8 | 50.6 | 39.5 | 50.2 | 0.79 | 51.1 | 38.8 | 50.7 | 0.77 | 1.0 |
| Comparative Example 9 | 48.7 | 39.2 | 60.0 | 0.77 | 48.7 | 38.9 | 51.1 | 0.76 | 0.4 |
| Comparative Example 10 | 41.7 | 41.6 | 49.6 | 0.83 | 41.4 | 39.8 | 51.4 | 0.78 | 2.4 |
| Comparative Example 11 | 19.3 | 31.5 | 19.2 | 1.64 | 20.5 | 34.8 | 22.9 | 1.52 | 5.1 |
| Comparative Example 12 | 27.4 | 34.3 | 33.1 | 1.04 | 28.2 | 36.9 | 38.6 | 0.96 | 6.2 |

INDUSTRIAL APPLICABILITY

The zirconia sintered bodies according to the present invention are sintered bodies that have high densities, are red, and exhibit stable hues regardless of the thicknesses thereof to realize good aesthetic properties. The zirconia sintered bodies are applicable to members such as jewelry and decorative members that are scratch-resistant and have a high-grade appearance, for example, various members such as timepiece components and exterior components of portable electronic devices.

The entire contents of the specifications, claims, drawing, and abstracts of Japanese Patent Application No. 2015-174087 filed on Sep. 3, 2015 and Japanese Patent Application No. 2015-205328 filed on Oct. 19, 2015 are incorporated herein by reference as a disclosure of the specification of the present invention.

REFERENCE SIGNS LIST (1) . . . crystal grain of zirconia
(2) . . . crystal grain of oxide of aluminum
(3) . . . region of sintered body of the present invention
(4) . . . region of color sintered body
(5) . . . interface between sintered body of the present invention and color sintered body

The invention claimed is:

1. A red color zirconia sintered body comprising an oxide of cerium in an amount of 0.5% by mole or more and less than 4% by mole in terms of $CeO_2$; yttria in an amount of 2% by mole or more and less than 6% by mole; an oxide of aluminum in an amount of 0.1% by weight or more and less than 2% by weight; and the balance being zirconia,
wherein the oxide of cerium contains trivalent cerium, and the zirconia has a crystal structure including a tetragonal crystal; and
wherein a lightness L* is 20 or more, a hue a* is 30 or more, and a ratio of the hue a* to a hue b* satisfies 0.9≤a*/b*, in an L*a*b* color system.

2. The red color zirconia sintered body according to claim 1, wherein the oxide of aluminum comprises at least one selected from the group consisting of spinel ($MgAl_2O_4$), lanthanum aluminate ($LaAl_{11}O_{19}$), and aluminum oxide.

3. The red color zirconia sintered body according to claim 1, wherein crystal grains of zirconia have an average crystal grain size of 2 µm or less.

4. A method for manufacturing the red color zirconia sintered body according to claim 1, the method comprising sintering, in a reducing atmosphere, a compact containing yttria in an amount of 2% by mole or more and less than 6% by mole, an oxide of cerium in an amount of 0.5% by mole or more and less than 4% by mole in terms of $CeO_2$, an oxide of aluminum in an amount of 0.1% by weight or more and less than 2% by weight, and the balance being zirconia.

5. The manufacturing method according to claim 4, wherein the sintering includes a primary sintering subjecting the compact to pressureless sintering to obtain a primary sintered body, and a secondary sintering subjecting the primary sintered body to hot isostatic pressing.

6. The manufacturing method according to claim 4, wherein the sintering includes a primary sintering subjecting the compact to pressureless sintering in an oxidizing atmosphere to obtain a primary sintered body, and a secondary sintering subjecting the primary sintered body to pressureless sintering in a reducing atmosphere.

7. A member comprising the red color zirconia sintered body according to claim 1.

8. A zirconia complex sintered body comprising the red color zirconia sintered body according to claim 1 and a zirconia sintered body containing at least one element selected from the group consisting of Al, Ti, Pr, Nd, Eu, Tb, Ho, Er, Yb, and Gd.

* * * * *